(12) United States Patent
Li et al.

(10) Patent No.: US 10,321,493 B2
(45) Date of Patent: Jun. 11, 2019

(54) METHOD FOR ESTABLISHING CONNECTION BY TERMINAL, APPARATUS, AND SYSTEM

(71) Applicant: Huawei Technologies Co., Ltd., Shenzhen (CN)

(72) Inventors: Xiaoxian Li, Shenzhen (CN); Zhiming Ding, Shenzhen (CN); Su Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 305 days.

(21) Appl. No.: 15/329,429

(22) PCT Filed: Jul. 20, 2015

(86) PCT No.: PCT/CN2015/084478
§ 371 (c)(1),
(2) Date: Jan. 26, 2017

(87) PCT Pub. No.: WO2016/015573
PCT Pub. Date: Feb. 4, 2016

(65) Prior Publication Data
US 2017/0223754 A1    Aug. 3, 2017

(30) Foreign Application Priority Data

Jul. 31, 2014  (CN) .......................... 2014 1 0374903

(51) Int. Cl.
*H04L 29/12*   (2006.01)
*H04W 76/11*   (2018.01)
(Continued)

(52) U.S. Cl.
CPC ......... *H04W 76/11* (2018.02); *H04L 61/2038* (2013.01); *H04L 63/1475* (2013.01);
(Continued)

(58) Field of Classification Search
CPC ..... H04W 12/02; H04W 76/11; H04W 12/12; H04W 12/06; H04L 63/1475; H04L 61/2038; H04L 67/141; H04L 61/6022
See application file for complete search history.

(56) References Cited

U.S. PATENT DOCUMENTS

2004/0006642 A1   1/2004  Jang et al.
2005/0097314 A1   5/2005  Matsushima
(Continued)

FOREIGN PATENT DOCUMENTS

CN    101785277 A    7/2010
CN    102264071 A   11/2011
(Continued)

OTHER PUBLICATIONS

Machine Translation and Abstract of Korean Publication No. KR20040004925, Jan. 16, 2004, 9 pages.
(Continued)

*Primary Examiner* — Oanh Duong
(74) *Attorney, Agent, or Firm* — Conley Rose, P.C.

(57) ABSTRACT

A method for establishing a connection by a terminal, an apparatus, and a system, where the method includes acquiring, by a first wireless terminal, a first media access control (MAC) address of a second wireless terminal, sending, by the first wireless terminal, a first message carrying identifier information such that the second wireless terminal receives the first message carrying the identifier information and verifies the identifier information, where the identifier information is obtained by the first wireless terminal according to at least the first MAC address, receiving, by the first wireless terminal, a first response message that is sent by the second wireless terminal and that carries a second MAC address of the second wireless terminal, and establishing, by the first
(Continued)

wireless terminal, a connection to the second wireless terminal according to the second MAC address.

20 Claims, 10 Drawing Sheets

(51) Int. Cl.
*H04W 12/02* (2009.01)
*H04L 29/06* (2006.01)
*H04L 29/08* (2006.01)
*H04W 12/12* (2009.01)
*H04W 12/06* (2009.01)

(52) U.S. Cl.
CPC ......... *H04W 12/02* (2013.01); *H04L 61/6022* (2013.01); *H04L 63/0876* (2013.01); *H04L 67/141* (2013.01); *H04W 12/06* (2013.01); *H04W 12/12* (2013.01)

(56) References Cited

U.S. PATENT DOCUMENTS

| | | | |
|---|---|---|---|
| 2007/0019609 | A1 | 1/2007 | Anjum |
| 2007/0047585 | A1 | 3/2007 | Gillespie et al. |
| 2007/0118748 | A1 | 5/2007 | Edney |
| 2009/0061820 | A1 | 3/2009 | Patel et al. |
| 2009/0074187 | A1 | 3/2009 | Inoue et al. |
| 2010/0014464 | A1 | 1/2010 | Hirano et al. |
| 2010/0098085 | A1* | 4/2010 | Wu ............ H04L 45/00 370/392 |
| 2011/0055409 | A1 | 3/2011 | Tsai |
| 2011/0321126 | A1 | 12/2011 | Maniatopoulos |
| 2012/0076072 | A1 | 3/2012 | Jalfon et al. |
| 2012/0257753 | A1 | 10/2012 | Ochikubo et al. |
| 2013/0272224 | A1 | 10/2013 | Ogawara |
| 2014/0064185 | A1 | 3/2014 | Abraham et al. |
| 2014/0140335 | A1* | 5/2014 | Wang ............ H04W 28/08 370/338 |
| 2015/0256546 | A1* | 9/2015 | Zhu ............ H04W 12/08 726/4 |

FOREIGN PATENT DOCUMENTS

| | | |
|---|---|---|
| CN | 103119974 A | 5/2013 |
| JP | 2005130444 A | 5/2005 |
| JP | 2008547328 A | 12/2008 |
| JP | 2013521733 A | 6/2013 |
| JP | 2013222991 A | 10/2013 |
| KR | 20040004925 A | 1/2004 |
| WO | 2007032499 A1 | 3/2007 |
| WO | 2008078632 A1 | 7/2008 |
| WO | 2012040736 A2 | 3/2012 |

OTHER PUBLICATIONS

Foreign Communication From a Counterpart Application, Korean Application No. 10-2017-7003948, Korean Notice of Allowance and Brief Translation dated Feb. 27, 2018, 3 pages.
Foreign Communication From a Counterpart Application, European Application No. 15827050.4, Extended European Search Report dated May 4, 2017, 7 pages.
Foreign Communication From a Counterpart Application, PCT Application No. PCT/CN2015/084478, English Translation of International Search Report dated Oct. 19, 2015, 2 pages.
Foreign Communication From a Counterpart Application, PCT Application No. PCT/CN2015/084478, English Translation of Written Opinion dated Oct. 19, 2015, 5 pages.
Machine Translation and Abstract of Japanese Publication No. JP2013521733, Jun. 10, 2013, 33 pages.
Foreign Communication From a Counterpart Application, Japanese Application No. 2017-502774, Japanese Office Action dated Mar. 13, 2018, 3 pages.
Foreign Communication From a Counterpart Application, Japanese Application No. 2017-502774, English Translation of Japanese Office Action dated Mar. 20, 2018, 5 pages.

* cited by examiner

METHOD FOR ESTABLISHING CONNECTION BY TERMINAL, APPARATUS, AND SYSTEM

CROSS-REFERENCE TO RELATED APPLICATIONS

This application is a U.S. National Stage of International Patent Application No. PCT/CN2015/084478 filed on Jul. 20, 2015, which claims priority to Chinese Patent Application No. 201410374903.6 filed on Jul. 31, 2014. The disclosures of the aforementioned applications are hereby incorporated by reference in their entireties.

TECHNICAL FIELD

The present disclosure relates to the communications field, and in particular, to a method for establishing a connection by a terminal, an apparatus, and a system.

BACKGROUND

The Institute of Electrical and Electronics Engineers (IEEE) 802.11 protocol specifies that, in a wireless local area network (WLAN), addressing is performed between wireless terminals based on a Media Access Control (MAC) address, where the MAC address is a physical address of a wireless terminal and is burnt into a network adapter of the wireless terminal. When a message is sent between wireless terminals, a MAC address of a receive end and a MAC address of a transmit end are carried in a MAC message header of the message. In this case, if an eavesdropping device eavesdrops on the message by means of an air interface link, after parsing the message, the eavesdropping device may obtain the MAC address of the transmit end and the MAC address of the receive end of the message, to further acquire user information of the transmit end or the receive end by tracing the MAC address of the transmit end or the MAC address of the receive end, causing leakage of the user information of the transmit end or the receive end.

The problem that an eavesdropping device eavesdrops on a message by means of an air interface link and acquires user information of a transmit end or a receive end is resolved using the following method. The receive end periodically changes a MAC address used to send a message, and sends the changed MAC address to the transmit end in a broadcast manner or the like. In this case, when the transmit end sends a message to the receive end, the transmit end adds the changed MAC address of the receive end and a current MAC address of the transmit end to a MAC message header of the message. In this way, MAC addresses of the receive end that are included in the messages obtained by the eavesdropping device through eavesdropping in different periods are different, and consequently, the eavesdropping device determines that the acquired MAC addresses are MAC addresses of different receive ends, and cannot acquire user information of the receive end by tracing the MAC address of the receive end, thereby ensuring security of the user information of the receive end. Likewise, if a MAC address used by the transmit end when the transmit end currently sends a message is different from an original MAC address, the eavesdropping device cannot acquire user information of the transmit end by tracing the MAC address of the transmit end either, thereby ensuring security of the user information of the transmit end.

However, the foregoing implementation manner is not universal. When a MAC address used when the receive end sends a message is already changed, and the receive end has only one interface of the changed MAC address, when the transmit end sends a message to the receive end, a MAC address of the receive end before change and a current MAC address of the transmit end are carried in a MAC message header of the message. The receive end parses the MAC message header of the message when the receive end receives the message at an interface of the changed MAC address. In this case, the MAC address of the receive end obtained through parsing is not the changed MAC address of the receive end, and the receive end may determine that the message is not sent to the receive end itself, and further does not parse the message. Consequently, the transmit end cannot communicate with the receive end. For example, in a scenario in which a MAC address used when a receive end sends a message is coded by means of a two-dimensional barcode, a transmit end may acquire, by scanning the two-dimensional barcode, the MAC address used when the receive end sends the message, and further performs handshaking with and communicates with the receive end using the MAC address. However, after the MAC address used when the receive end sends the message is changed and the receive end has only one interface of the changed MAC address, the transmit end cannot acquire the changed MAC address of the receive end. Therefore, when the transmit end sends a message to the receive end, the MAC address of the receive end before the change and a current MAC address of the transmit end are carried in a MAC message header of the message. The receive end parses the MAC message header of the message when the receive end receives, at the interface of the changed MAC address, the message sent by the transmit end. In this case, the MAC address of the receive end obtained through parsing is not the changed MAC address of the receive end, and the receive end may determine that the message is not sent to the receive end itself, and further does not parse the message. Consequently, the transmit end cannot communicate with the receive end.

SUMMARY

Embodiments of the present disclosure provide a method for establishing a connection by a terminal, an apparatus, and a system in order to ensure that in a scenario of communication based on a WLAN and a wireless terminal can normally communicate with another wireless terminal when a MAC address of the wireless terminal is changed.

To achieve the foregoing objective, the following technical solutions are used in the embodiments of the present disclosure.

According to a first aspect, an embodiment of the present disclosure provides a method for establishing a connection by a terminal, including acquiring, by a first wireless terminal, a first MAC address of a second wireless terminal, sending, by the first wireless terminal, a first message carrying identifier information such that the second wireless terminal receives the first message and verifies the identifier information, where the identifier information is obtained by the first wireless terminal according to at least the first MAC address, receiving, by the first wireless terminal, a first response message sent by the second wireless terminal and carries a second MAC address of the second wireless terminal, where the second MAC address is a current MAC address of the second wireless terminal, and the first response message is a message that is sent by the second wireless terminal after the second wireless terminal successfully verifies the identifier information, and communicating, by the first wireless terminal, with the second wireless terminal according to the second MAC address.

In a first possible implementation manner of the first aspect, the identifier information obtained by the first wireless terminal according to the first MAC address includes first identifier information, and the first identifier information is an M-bit operation result obtained after the first wireless terminal performs a first hash operation on the first MAC address, where M is an integer greater than zero and less than a quantity of bits of the first MAC address.

With reference to the first aspect, in a second possible implementation manner of the first aspect, the identifier information obtained by the first wireless terminal according to the first MAC address includes a third MAC address. The third MAC address is generated by the first wireless terminal according to first identifier information, and the first identifier information is an M-bit operation result obtained after the first wireless terminal performs a first hash operation on the first MAC address, and sending, by the first wireless terminal, a first message carrying identifier information includes sending, by the first wireless terminal, the first message carrying a receive address being the third MAC address.

With reference to the first or second possible implementation manner of the first aspect, in a third possible implementation manner of the first aspect, receiving, by the first wireless terminal, a first response message sent by the second wireless terminal and carries a second MAC address of the second wireless terminal includes receiving, by the first wireless terminal, the first response message sent by the second wireless terminal and carries the second identifier information, a first random parameter, and the second MAC address of the second wireless terminal, where the second identifier information is an N-bit operation result obtained after the second wireless terminal performs a second hash operation on the first random parameter and the first MAC address, and N is an integer greater than zero and less than a quantity of bits of the first MAC address, and after receiving, by the first wireless terminal, a first response message that is sent by the second wireless terminal and that carries a second MAC address of the second wireless terminal, the method further includes parsing, by the first wireless terminal, the first response message to acquire the second identifier information and the first random parameter, performing the second hash operation on the first random parameter and the first MAC address to obtain an N-bit operation result, using the N-bit operation result as first reference identifier information, comparing the first reference identifier information with the second identifier information, and determining that the first response message is sent by the correct second wireless terminal if the first reference identifier information is the same as the second identifier information.

With reference to the first possible implementation manner of the first aspect, in a fourth possible implementation manner of the first aspect, the identifier information obtained by the first wireless terminal according to the first MAC address further includes third identifier information, and the third identifier information is an N-bit operation result obtained after the first wireless terminal performs a second hash operation on a second random parameter and the first MAC address, and the second random parameter is generated by the first wireless terminal.

With reference to the fourth possible implementation manner of the first aspect, in a fifth possible implementation manner of the first aspect, sending, by the first wireless terminal, a first message carrying identifier information includes sending, by the first wireless terminal, the first message that carries the first identifier information, the third identifier information, and the second random parameter.

With reference to the first aspect, in a sixth possible implementation manner of the first aspect, that the identifier information is obtained by the first wireless terminal according to the first MAC address includes a fourth MAC address and third identifier information. The fourth MAC address is generated by the first wireless terminal according to first identifier information. The first identifier information is an M-bit operation result obtained after the first wireless terminal performs a first hash operation on the first MAC address, and the third identifier information is an N-bit operation result obtained after the first wireless terminal performs a second hash operation on a second random parameter and the first MAC address, and the second random parameter is generated by the first wireless terminal, and the sending, by the first wireless terminal, a first message carrying identifier information includes sending, by the first wireless terminal, the first message that carries the third identifier information, the second random parameter, and a receive address being the fourth MAC address.

With reference to the first aspect, or the first or second possible implementation manner of the first aspect, or any one of the fourth to sixth possible implementation manners of the first aspect, in a seventh possible implementation manner of the first aspect, receiving, by the first wireless terminal, a first response message that is sent by the second wireless terminal and that carries a second MAC address of the second wireless terminal includes receiving, by the first wireless terminal, the first response message that is sent by the second wireless terminal and that carries first indication information and the second MAC address of the second wireless terminal, where the first indication information is used to indicate that the verification succeeds.

With reference to the first aspect, or any one of the first to seventh possible implementation manners of the first aspect, in an eighth possible implementation manner of the first aspect, before the sending, by the first wireless terminal, a first message, the method further includes sending, by the first wireless terminal, a second message carrying the first MAC address of the second wireless terminal to the second wireless terminal, and determining that a current MAC address of the second wireless terminal is not the first MAC address if a second response message that is sent by the second wireless terminal and that carries second indication information is not received within a preset time, where the second indication information is used to indicate that the first MAC address is the current MAC address of the second wireless terminal.

According to a second aspect, an embodiment of the present disclosure provides a method for establishing a connection by a terminal, including receiving, by a second wireless terminal, a first message that is sent by a first wireless terminal and that carries identifier information, where the identifier information is obtained by the first wireless terminal after the first wireless terminal acquires a first MAC address of the second wireless terminal and according to at least the first MAC address, determining, by the second wireless terminal, whether the identifier information carried in the first message is correct, and sending, by the second wireless terminal, a first response message carrying a second MAC address of the second wireless terminal to the first wireless terminal if the identifier information carried in the first message is correct, where the second MAC address is a current MAC address of the second wireless terminal.

In a first possible implementation manner of the second aspect, receiving, by a second wireless terminal, a first message that is sent by a first wireless terminal and that carries identifier information includes receiving, by the second wireless terminal, the first message that is sent by the first wireless terminal and that carries first identifier information, where the first identifier information is an M-bit operation result obtained after the first wireless terminal performs a first hash operation on the first MAC address, and M is an integer greater than zero and less than a quantity of bits of the first MAC address, or receiving, by the second wireless terminal, the first message that is sent by the first wireless terminal and that carries first identifier information, third identifier information, and a second random parameter, where the second random parameter is a parameter generated by the first wireless terminal, the third identifier information is an N-bit operation result obtained after the first wireless terminal performs a second hash operation on the second random parameter and the first MAC address, and N is an integer greater than zero and less than a quantity of bits of the first MAC address, or receiving, by the second wireless terminal, the first message that is sent by the first wireless terminal and that carries a receive address being a third MAC address, where the third MAC address is generated by the first wireless terminal according to first identifier information, or receiving, by the second wireless terminal, the first message that is sent by the first wireless terminal and that carries third identifier information, a second random parameter, and a receive address being a fourth MAC address, where the fourth MAC address is generated by the first wireless terminal according to first identifier information.

With reference to the first possible implementation manner of the second aspect, in a second possible implementation manner of the second aspect, in a case in which the second wireless terminal receives the first message that is sent by the first wireless terminal and that carries the first identifier information, determining, by the second wireless terminal, whether the identifier information carried in the first message is correct includes parsing, by the second wireless terminal, the first message to acquire the first identifier information, and determining whether the first identifier information is the same as preset identifier information, where the preset identifier information is an M-bit operation result obtained after the second wireless terminal performs the first hash operation on the first MAC address, and determining that the first identifier information is correct if the first identifier information is the same as the preset identifier information.

With reference to the first possible implementation manner of the second aspect, in a third possible implementation manner of the second aspect, when the second wireless terminal receives the first message that is sent by the first wireless terminal and that carries the receive address being the third MAC address, determining, by the second wireless terminal, whether the identifier information carried in the first message is correct includes determining that the third MAC address is correct when the second wireless terminal receives, at a first address interface, the first message carrying the receive address being the third MAC address, where an address of the first address port is the same as the third MAC address.

With reference to the second or third possible implementation manner of the second aspect, in a fourth possible implementation manner of the second aspect, before sending, by the second wireless terminal, a first response message carrying a second MAC address of the second wireless terminal to the first wireless terminal, the method further includes generating, by the second wireless terminal, a first random parameter, performing the second hash operation on the first random parameter and the first MAC address to obtain an N-bit operation result, and using the N-bit operation result as second identifier information, and sending, by the second wireless terminal, a first response message carrying a second MAC address of the second wireless terminal to the first wireless terminal includes sending, by the second wireless terminal, the first response message that carries the second identifier information, the first random parameter, and the second MAC address of the second wireless terminal to the first wireless terminal.

With reference to the first possible implementation manner of the second aspect, in a fifth possible implementation manner of the second aspect, when the second wireless terminal receives the first message that is sent by the first wireless terminal and that carries the third identifier information, the second random parameter, and the receive address being the fourth MAC address, determining, by the second wireless terminal, whether the identifier information carried in the first message is correct further includes, when the second wireless terminal receives, at a first address interface, the first message that carries the third identifier information, the second random parameter, and the receive address being the fourth MAC address, determining that the fourth MAC address is correct, parsing the first message to acquire the third identifier information and the second random parameter, performing the second hash operation on the second random parameter and the first MAC address to obtain an N-bit operation result, using the N-bit operation result as second reference identifier information, comparing the second reference identifier information with the third identifier information, and determining that the third identifier information is correct if the second reference identifier information is the same as the third identifier information, where an address of the first address interface is the same as the fourth MAC address.

With reference to the third possible implementation manner of the second aspect, in a sixth possible implementation manner of the second aspect, when the second wireless terminal receives the first message that is sent by the first wireless terminal and that carries the first identifier information, the third identifier information, and the second random parameter, determining, by the second wireless terminal, whether the identifier information carried in the first message is correct includes parsing, by the second wireless terminal, the first message to acquire the first identifier information, the second random parameter, and the third identifier information, and determining whether the first identifier information is the same as preset identifier information, where the preset identifier information is an M-bit operation result obtained after the second wireless terminal performs the first hash operation on the first MAC address, and if determining that the first identifier information is the same as the preset identifier information, determining that the first identifier information is correct, performing the second hash operation on the second random parameter and the first MAC address to obtain an N-bit operation result, using the N-bit operation result as second reference identifier information, comparing the second reference identifier information with the third identifier information, and determining that the third identifier information is correct if the second reference identifier information is the same as the third identifier information.

With reference to the second aspect, or any one of the first to third possible implementation manners of the second aspect, or the fifth or sixth possible implementation manner of the second aspect, in a seventh possible implementation manner of the second aspect, sending, by the second wireless terminal, a first response message carrying a second MAC address of the second wireless terminal to the first wireless terminal includes sending, by the second wireless terminal, the first response message that carries first indication information and the second MAC address of the second wireless terminal to the first wireless terminal, where the first indication information is used to indicate that the verification succeeds.

With reference to the second aspect, or any one of the first to seventh possible implementation manners of the second aspect, in an eighth possible implementation manner of the second aspect, before receiving, by a second wireless terminal, a first message that is sent by a first wireless terminal and that carries identifier information, the method further includes receiving, by the second wireless terminal, a second message that is sent by the first wireless terminal and that carries the first MAC address of the second wireless terminal, and sending, by the second wireless terminal, a second response message carrying second indication information to the first wireless terminal when the first MAC address carried in the second message is the same as the second MAC address of the second wireless terminal, where the second indication information is used to indicate that the first MAC address is a current MAC address of the second wireless terminal.

According to a third aspect, an embodiment of the present disclosure provides a wireless terminal, including an acquiring unit configured to acquire a first MAC address of a second wireless terminal, a sending unit configured to send a first message carrying identifier information such that the second wireless terminal receives the first message and verifies the identifier information, where the identifier information is obtained by the wireless terminal according to at least the first MAC address, a receiving unit configured to receive a first response message that is sent by the second wireless terminal and that carries a second MAC address of the second wireless terminal, where the second MAC address is a current MAC address of the second wireless terminal, and the first response message is a message that is sent by the second wireless terminal after the second wireless terminal successfully verifies the identifier information, and a processing unit configured to communicate with the second wireless terminal according to the second MAC address of the second wireless terminal received by the receiving unit.

With reference to the third aspect, in a first possible implementation manner of the third aspect, the identifier information includes first identifier information, and the first identifier information is an M-bit operation result obtained after the processing unit performs a first hash operation on the first MAC address, where M is an integer greater than zero and less than a quantity of bits of the first MAC address.

With reference to the third aspect, in a second possible implementation manner of the third aspect, the identifier information includes a third MAC address. The third MAC address is generated by the processing unit according to first identifier information, and the first identifier information is an M-bit operation result obtained after the processing unit performs a first hash operation on the first MAC address, and the sending unit is further configured to send the first message carrying a receive address being the third MAC address generated by the processing unit.

With reference to the first or second possible implementation manner of the third aspect, in a third possible implementation manner of the third aspect, the receiving unit is further configured to receive the first response message that is sent by the second wireless terminal and that carries second identifier information, a first random parameter, and the second MAC address of the second wireless terminal, where the second identifier information is an N-bit operation result obtained after the second wireless terminal performs a second hash operation on the first random parameter and the first MAC address, and N is an integer greater than zero and less than a quantity of bits of the first MAC address, and the processing unit is further configured to parse the first response message received by the receiving unit to acquire the second identifier information and the first random parameter, perform the second hash operation on the first random parameter and the first MAC address to obtain an N-bit operation result, use the N-bit operation result as first reference identifier information, compare the first reference identifier information with the second identifier information, and determine that the first response message is sent by the correct second wireless terminal if the first reference identifier information is the same as the second identifier information.

With reference to the first possible implementation manner of the third aspect, in a fourth possible implementation manner of the third aspect, the identifier information further includes third identifier information, and the third identifier information is an N-bit operation result obtained after the processing unit performs a second hash operation on a second random parameter and the first MAC address, and the second random parameter is generated by the processing unit.

With reference to the fourth possible implementation manner of the third aspect, in a fifth possible implementation manner of the third aspect, the sending unit is further configured to send the first message that carries the first identifier information, the third identifier information, and the second random parameter that are obtained by the processing unit.

With reference to the third aspect, in a sixth possible implementation manner of the third aspect, the identifier information includes a fourth MAC address and third identifier information. The fourth MAC address is generated by the processing unit according to first identifier information. The first identifier information is an M-bit operation result obtained after the processing unit performs a first hash operation on the first MAC address, and the third identifier information is an N-bit operation result obtained after the processing unit performs a second hash operation on a second random parameter and the first MAC address, and the second random parameter is generated by the processing unit, and the sending unit is further configured to send the first message that carries the third identifier information, the second random parameter, and a receive address being the fourth MAC address that is generated by the processing unit.

With reference to the third aspect, or the first or second possible implementation manner of the third aspect, or any one of the fourth to sixth possible implementation manners of the third aspect, in a seventh possible implementation manner of the third aspect, the receiving unit is further configured to receive the first response message that is sent by the second wireless terminal and that carries first indication information and the second MAC address of the second wireless terminal, where the first indication information is used to indicate that the verification succeeds.

With reference to the third aspect, or any one of the first to seventh possible implementation manners of the third aspect, in an eighth possible implementation manner of the third aspect, the sending unit is further configured to send the second message carrying the first MAC address of the second wireless terminal to the second wireless terminal, and the processing unit is further configured to determine that a current MAC address of the second wireless terminal is not the first MAC address when the receiving unit does not receive, within a preset time, a second response message that is sent by the second wireless terminal and that carries second indication information, where the second indication information is used to indicate that the first MAC address is the current MAC address of the second wireless terminal.

According to a fourth aspect, an embodiment of the present disclosure provides a wireless terminal, including a receiving unit configured to receive a first message that is sent by a first wireless terminal and that carries identifier information, where the identifier information is obtained by the first wireless terminal after the first wireless terminal acquires a first MAC address of the wireless terminal and according to at least the first MAC address, a processing unit configured to determine whether the identifier information carried in the first message received by the receiving unit is correct, and a sending unit configured to send a first response message carrying a second MAC address of the wireless terminal to the first wireless terminal when the processing unit determines that the identifier information carried in the first message is correct, where the second MAC address is a current MAC address of the second wireless terminal.

With reference to the fourth aspect, in a first possible implementation manner of the fourth aspect, the receiving unit is further configured to receive the first message that is sent by the first wireless terminal and that carries first identifier information, where the first identifier information is an M-bit operation result obtained after the first wireless terminal performs a first hash operation on the first MAC address, and M is an integer greater than zero and less than a quantity of bits of the first MAC address, or receive the first message that is sent by the first wireless terminal and that carries first identifier information, third identifier information, and a second random parameter, where the second random parameter is a parameter generated by the first wireless terminal, the third identifier information is an N-bit operation result obtained after the first wireless terminal performs a second hash operation on the second random parameter and the first MAC address, and N is an integer greater than zero and less than a quantity of bits of the first MAC address, or receive the first message that is sent by the first wireless terminal and that carries a receive address being a third MAC address, where the third MAC address is generated by the first wireless terminal according to first identifier information, or receive the first message that is sent by the first wireless terminal and that carries third identifier information, a second random parameter, and a receive address being a fourth MAC address, where the fourth MAC address is generated by the first wireless terminal according to first identifier information.

With reference to the first possible implementation manner of the fourth aspect, in a second possible implementation manner of the fourth aspect, the processing unit is further configured to parse the first message to acquire the first identifier information, and determine whether the first identifier information is the same as preset identifier information when the receiving unit receives the first message that is sent by the first wireless terminal and that carries the first identifier information, where the preset identifier information is an M-bit operation result obtained after the wireless terminal performs the first hash operation on the first MAC address, and determine that the first identifier information is correct if the first identifier information is the same as the preset identifier information.

With reference to the first possible implementation manner of the fourth aspect, in a third possible implementation manner of the fourth aspect, the processing unit is further configured to determine that the third MAC address is correct when the receiving unit receives, at a first address interface, the first message carrying the receive address being the third MAC address, where an address of the first address port is the same as the third MAC address.

With reference to the second or third possible implementation manner of the fourth aspect, in a fourth possible implementation manner of the fourth aspect, the processing unit is further configured to generate a first random parameter, perform the second hash operation on the first random parameter and the first MAC address to obtain an N-bit operation result, and use the N-bit operation result as second identifier information, and the sending unit is further configured to send the first response message that carries the first random parameter, the second MAC address of the wireless terminal, and the second identifier information that is obtained by the processing unit to the first wireless terminal.

With reference to the first possible implementation manner of the fourth aspect, in a fifth possible implementation manner of the fourth aspect, when the receiving unit receives, at a first address interface, the first message that carries the third identifier information, the second random parameter, and the receive address being the fourth MAC address, the processing unit is further configured to determine that the fourth MAC address is correct, parse the first message to acquire the third identifier information and the second random parameter, perform the second hash operation on the second random parameter and the first MAC address to obtain an N-bit operation result, use the N-bit operation result as second reference identifier information, compare the second reference identifier information with the third identifier information, and if the second reference identifier information is the same as the third identifier information, where an address of the first address interface is the same as the fourth MAC address determine that the third identifier information is correct.

With reference to the first possible implementation manner of the fourth aspect, in a sixth possible implementation manner of the fourth aspect, when the receiving unit receives the first message that carries the first identifier information, the third identifier information, and the second random parameter, the processing unit is further configured to parse the first message to acquire the first identifier information, the second random parameter, and the third identifier information, and determine whether the first identifier information is the same as preset identifier information, where the preset identifier information is an M-bit operation result obtained after the second wireless terminal performs the first hash operation on the first MAC address, and if the first identifier information is the same as the preset identifier information, determine that the first identifier information is correct, perform the second hash operation on the second random parameter and the first MAC address to obtain an N-bit operation result, use the N-bit operation result as second reference identifier information, compare the second reference identifier information with the third identifier information, and determine that the third identifier information is correct if the second reference identifier information is the same as the third identifier information.

With reference to the fourth aspect, or any one of the first to third possible implementation manners of the fourth aspect, or the fifth or sixth possible implementation manner of the fourth aspect, in a seventh possible implementation manner of the fourth aspect, the sending unit is further configured to send the first response message that carries first indication information and the second MAC address of the wireless terminal to the first wireless terminal, where the first indication information is used to indicate that the verification succeeds.

With reference to the fourth aspect, or any one of the first to seventh possible implementation manners of the fourth aspect, in an eighth possible implementation manner of the fourth aspect, the receiving unit is further configured to receive the second message that is sent by the first wireless terminal and that carries the first MAC address of the wireless terminal, and the sending unit is further configured to send a second response message carrying second indication information to the first wireless terminal when the processing unit determines that the first MAC address carried in the second message received by the receiving unit is the same as the second MAC address of the wireless terminal, where the second indication information is used to indicate that the first MAC address is a current MAC address of the second wireless terminal.

In the method for establishing a connection by a terminal, the apparatus, and the system that are provided in the embodiments of the present disclosure, after acquiring a first MAC address of a second wireless terminal, a first wireless terminal obtains identifier information according to at least the first MAC address, and sends a first message carrying the identifier information such that the second wireless terminal receives the first message, parses the first message to acquire the identifier information carried in the first message, verifies whether the acquired identifier information is correct, and sends a first response message carrying a second MAC address of the second wireless terminal to the first wireless terminal when the acquired identifier information is correct. When receiving the first response message carrying the second MAC address of the second wireless terminal, the first wireless terminal may acquire the second MAC address of the second wireless terminal, and further may use the second MAC address of the second wireless terminal, that is, a current MAC address of the second wireless terminal, as a receive address of a message sent by the first wireless terminal, and further communicate with the second wireless terminal. Because the identifier information is carried in the first message sent by the first wireless terminal, an eavesdropper cannot eavesdrop on the first MAC address of the second wireless terminal. Meanwhile, the second wireless terminal verifies the identifier information, and when determining that the identifier information is obtained according to the first MAC address of the second wireless terminal, sends the first response message to the first wireless terminal, to notify the first wireless terminal of the current MAC address of the second wireless terminal, therefore, in a case in which a MAC address of the second wireless terminal is changed, not only it is ensured that the second wireless terminal is not eavesdropped on, but also the first wireless terminal can normally communicate with the second wireless terminal.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
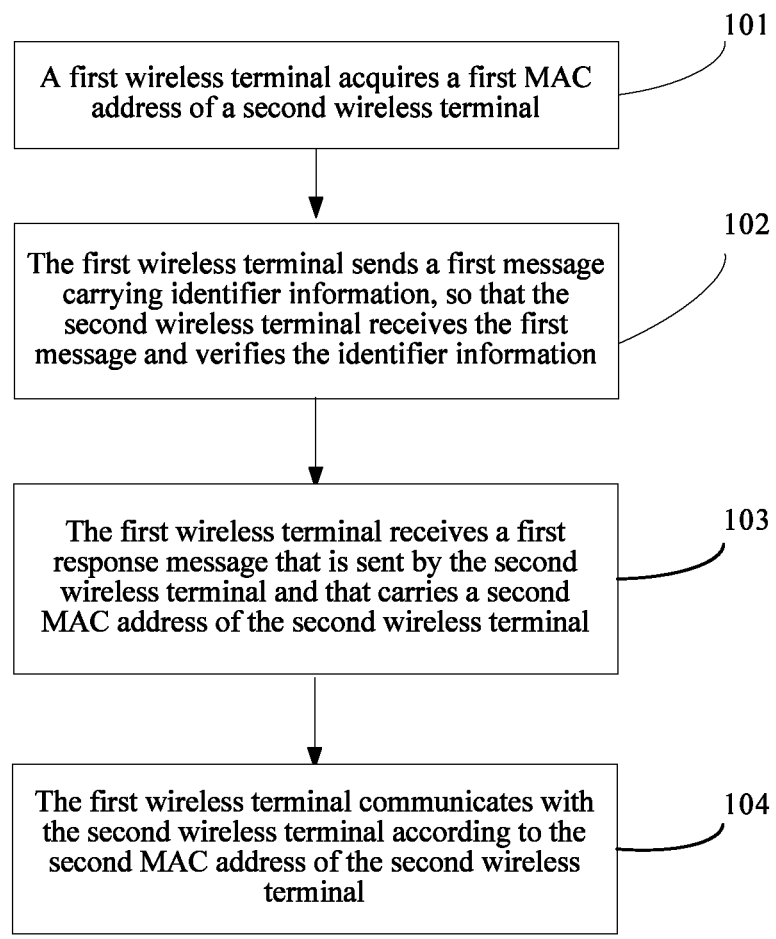
FIG. 1 is a schematic flowchart of a method for establishing a connection by a terminal according to an embodiment of the present disclosure.

An embodiment of the present disclosure provides a method for establishing a connection by a terminal, applied to a scenario of communication based on a WLAN. As shown in FIG. 1, the method includes the following steps.

Step 101: A first wireless terminal acquires a first MAC address of a second wireless terminal.

Further, acquiring, by a first wireless terminal, a first MAC address of a second wireless terminal may include acquiring the previously stored first MAC address of the second wireless terminal from a memory of the first wireless terminal, or may include acquiring the first MAC address of the second wireless terminal using the following several methods, which are further as follows.

In a first method, the first wireless terminal may acquire the first MAC address of the second wireless terminal using another channel except a Wi-Fi channel.

For example, the first wireless terminal first scans a two-dimensional barcode in which the first MAC address of the second wireless terminal is coded, and parses the acquired two-dimensional barcode, to acquire the first MAC address included in the two-dimensional barcode.

Alternatively, when the first wireless terminal is very close to the second wireless terminal, the first wireless terminal may directly acquire the first MAC address of the second wireless terminal using a near field communication (NFC) interface of the second wireless terminal.

Alternatively, when a user knows the first MAC address of the second wireless terminal, the user enters the first MAC address of the second wireless terminal through a user interface such that the first wireless terminal acquires the first MAC address of the second wireless terminal.

In a second method, the first wireless terminal acquires the first MAC address of the second wireless terminal by receiving a message sent by the second wireless terminal.

For example, the first wireless terminal receives a probe request message that is broadcast by the second wireless terminal at a particular period and that carries the first MAC address of the second wireless terminal, and parses the probe request message to acquire the first MAC address of the second wireless terminal.

It should be noted that, the first wireless terminal may also acquire the first MAC address of the second wireless terminal in another manner, for example, the first wireless terminal may receive a message that is sent by another device different from the second wireless terminal and that carries the first MAC address of the second wireless terminal, and parses the message to acquire the first MAC address of the second wireless terminal, which is not limited in the present disclosure.

It should be noted that, when the first wireless terminal communicates with the second wireless terminal, the first wireless terminal may be a device supporting Wi-Fi, for example, a mobile phone device, and the second wireless terminal is a wireless access point (AP), or the first wireless terminal is a wireless AP, and the second wireless terminal is a device supporting Wi-Fi, or both the first wireless terminal and the second wireless terminal are devices supporting Wi-Fi, which is not limited in the present disclosure.

Step 102: The first wireless terminal sends a first message carrying identifier information such that the second wireless terminal receives the first message and verifies the identifier information.

The identifier information is obtained by the first wireless terminal according to at least the first MAC address, and is different from the first MAC address. The identifier information is identifier information used for the second wireless terminal to verify the first wireless terminal.

It should be noted that the first wireless terminal obtaining the identifier information according to at least the first MAC address includes that the first wireless terminal may obtain the identifier information by processing only the first MAC address according to a preset rule or protocol between the first wireless terminal and the second wireless terminal.

The first wireless terminal may also obtain the identifier information by processing, according to a preset rule or protocol between the first wireless terminal and the second wireless terminal, the first MAC address and information that is pre-agreed between the first wireless terminal and the second wireless terminal. This method can ensure that the identifier information is hardly obtained by an eavesdropper according to the first MAC address.

It should be noted that, persons skilled in the art may understand that, when the first wireless terminal already establishes a communication connection to the second wireless terminal, the first wireless terminal may agree on one or more specific input values in the previous communication connection, and use the one or more specific input values as the information pre-agreed between the first wireless terminal and the second wireless terminal.

Further, after acquiring the first MAC address of the second wireless terminal, in order not to leak the first MAC address of the second wireless terminal, the first wireless terminal processes the first MAC address or the first MAC address and the information that is pre-agreed between the first wireless terminal and the second wireless terminal, for example, performs a proper hash operation on the first MAC address, such as secure hash algorithm (SHA)-256, SHA-1, or MD-5 processing, to obtain the identifier information, adds the identifier information to the first message, and sends the first message.

For a specific manner of sending the first message, when a receive address in a MAC message header of the first message has different content, sending manners are also different.

For example, if the receive address in the MAC message header of the first message is a broadcast address, the first wireless terminal broadcasts the first message, or the first wireless terminal sends the first message in a unicast manner if the receive address in the MAC message header of the first message is a MAC address generated according to the identifier information.

In this way, when the second wireless terminal receives the first message sent by the first wireless terminal, the second wireless terminal parses the first message to acquire the identifier information carried in the first message, and compares, according to the preset rule or protocol between the first wireless terminal and the second wireless terminal, the identifier information obtained by processing the first MAC address with the acquired identifier information, and if the identifier information obtained by processing the first MAC address is the same as the acquired identifier information, determines that the acquired identifier information is correct, or determines that the acquired identifier information is incorrect if the identifier information obtained by processing the first MAC address is different from the acquired identifier information. In this way, the second wireless terminal may determine, according to whether the identifier information is correct, whether to send a response message to the first wireless terminal.

It should be noted that, when the first wireless terminal sends the first message carrying the identifier information, a used sending address is a MAC address used when the first wireless terminal currently sends a message, that is, the MAC address currently used by the first wireless terminal is added to a sending address in the MAC message header of the first message.

Step 103: The first wireless terminal receives a first response message that is sent by the second wireless terminal and that carries a second MAC address of the second wireless terminal.

The second MAC address is a current MAC address of the second wireless terminal, and the first response message is a message that is sent by the second wireless terminal after the second wireless terminal successfully verifies the identifier information.

Further, after receiving the first response message that is sent by the second wireless terminal and that carries the second MAC address of the second wireless terminal, the first wireless terminal determines that verification on the sent first message carrying the identifier information succeeds, and may acquire the second MAC address of the second wireless terminal by parsing the first response message, that is, acquire the current MAC address of the second wireless terminal, to further transmit data to the second wireless terminal using the current MAC address of the second wireless terminal.

It should be noted that, the current MAC address of the second wireless terminal is a MAC address used when the second wireless terminal currently sends a message.

Step 104: The first wireless terminal communicates with the second wireless terminal according to the second MAC address of the second wireless terminal.

Further, when receiving the first response message sent by the second wireless terminal, the first wireless terminal parses the first response message, to acquire the second MAC address of the second wireless terminal, that is, the current MAC address of the second wireless terminal such that when needing to communicate with the second wireless terminal, the first wireless terminal may use the current MAC address of the second wireless terminal as a receive address when the first wireless terminal sends a message to the second wireless terminal, and uses a current MAC address of the first wireless terminal as a sending address to send a message to the second wireless terminal. In this way, it may be ensured that the first wireless terminal can normally communicate with the second wireless terminal.

In the method for establishing a connection by a terminal provided in this embodiment of the present disclosure, after acquiring a first MAC address of a second wireless terminal, a first wireless terminal obtains identifier information according to at least the first MAC address, and sends a first message carrying the identifier information such that the second wireless terminal receives the first message, parses the first message to acquire the identifier information carried in the first message, verifies whether the acquired identifier information is correct, and when determining that the acquired identifier information is correct, sends a first response message carrying a second MAC address of the second wireless terminal to the first wireless terminal. When receiving the first response message carrying the second MAC address of the second wireless terminal, the first wireless terminal may acquire the second MAC address of the second wireless terminal, and further may use the second MAC address of the second wireless terminal, that is, a current MAC address of the second wireless terminal, as a receive address of a message sent by the first wireless terminal, and further communicate with the second wireless terminal. Because the identifier information is carried in the first message sent by the first wireless terminal, an eavesdropper cannot eavesdrop on the first MAC address of the second wireless terminal. Meanwhile, the second wireless terminal verifies the identifier information, and sends the first response message to the first wireless terminal, to notify the first wireless terminal of the current MAC address of the second wireless terminal when the identifier information is obtained according to the first MAC address of the second wireless terminal. Therefore, when a MAC address of the second wireless terminal is changed, not only it is ensured that the second wireless terminal is not eavesdropped on, but also the first wireless terminal can normally communicate with the second wireless terminal.

Figure 2:
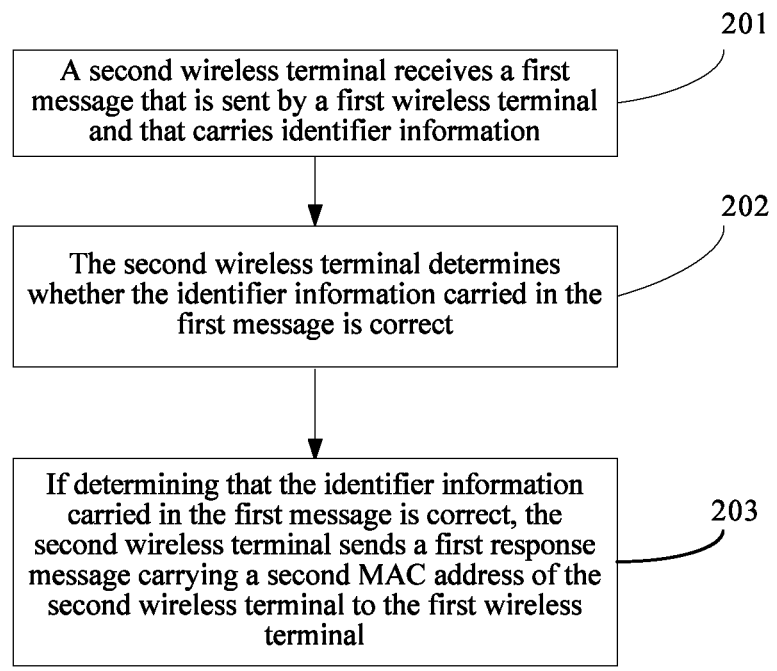
FIG. 2 is a schematic flowchart of another method for establishing a connection by a terminal according to an embodiment of the present disclosure.

An embodiment of the present disclosure provides a method for establishing a connection by a terminal, applied to a scenario of communication based on a WLAN. As shown in FIG. 2, the method includes the following steps.

Step 201: A second wireless terminal receives a first message that is sent by a first wireless terminal and that carries identifier information.

The identifier information is obtained by the first wireless terminal after the first wireless terminal acquires a first MAC address of the second wireless terminal and according to at least the first MAC address, and is different from the first MAC address. The identifier information is identifier information used for the second wireless terminal to verify the first wireless terminal.

Step 202: The second wireless terminal determines whether the identifier information carried in the first message is correct.

Further, after receiving the first message that is sent by the first wireless terminal and that carries the identifier information, the second wireless terminal parses the first message to acquire the identifier information carried in the first message and a MAC address currently used by the first wireless terminal, processes the first MAC address according to a preset rule or protocol between the first wireless terminal and the second wireless terminal, to obtain the identifier information, and compares the identifier information obtained by processing the first MAC address according to the preset rule or protocol between the first wireless terminal and the second wireless terminal with the acquired identifier information, and determines that the acquired identifier information is correct if the identifier information obtained by processing the first MAC address according to the preset rule or protocol between the first wireless terminal and the second wireless terminal is the same as the acquired identifier information, or determines that the acquired identifier information is incorrect if the identifier information obtained by processing the first MAC address according to the preset rule or protocol between the first wireless terminal and the second wireless terminal is different from the acquired identifier information.

Step 203: The second wireless terminal sends a first response message carrying a second MAC address of the second wireless terminal to the first wireless terminal if the identifier information carried in the first message is correct.

The second MAC address is a current MAC address of the second wireless terminal.

Further, the second wireless terminal uses the MAC address currently used by the second wireless terminal when the identifier information carried in the first message is correct, that is, the second MAC address, as a sending address to send the first response message, uses a MAC address currently used by the first wireless terminal as a receive address of the sent first response message, and sends the first response message to the first wireless terminal.

In the method for establishing a connection by a terminal provided in this embodiment of the present disclosure, after receiving a first message that is sent by a first wireless terminal and that carries identifier information, a second wireless terminal parses the first message to acquire the identifier information carried in the first message and a current MAC address of the first wireless terminal, determines whether the acquired identifier information is correct, and uses a current MAC address of the second wireless terminal if the acquired identifier information is correct, that is, a current MAC address of the second wireless terminal, as a sending address, uses a current MAC address of the first wireless terminal as a receive address, and sends a first response message to the first wireless terminal such that after receiving the first response message sent by the second wireless terminal, the first wireless terminal further communicates with the second wireless terminal according to the acquired second MAC address of the second wireless terminal. Because the identifier information is carried in the first message received by the second wireless terminal, an eavesdropper cannot eavesdrop on the first MAC address of the second wireless terminal. Meanwhile, the second wireless terminal verifies the identifier information, and when determining that the identifier information is obtained according to the first MAC address of the second wireless terminal, sends the first response message to the first wireless terminal, to notify the first wireless terminal of the current MAC address of the second wireless terminal. Therefore, in a case in which a MAC address of the second wireless terminal is changed, not only it is ensured that the second wireless terminal is not eavesdropped on, but also the first wireless terminal can normally communicate with the second wireless terminal.

An embodiment of the present disclosure provides a method for establishing a connection by a terminal, applied to a scenario of communication based on a WLAN. The method includes the following steps.

Step 301: A first wireless terminal acquires a first MAC address of a second wireless terminal.

For details, reference may be made to step 101, and details are not described herein again.

It should be noted that, when the first wireless terminal acquires the first MAC address of the second wireless terminal, the first wireless terminal may send a second message carrying the first MAC address of the second wireless terminal to the second wireless terminal, or may not send a second message carrying the first MAC address of the second wireless terminal to the second wireless terminal. When the first wireless terminal sends the second message carrying the first MAC address of the second wireless terminal to the second wireless terminal, the first wireless terminal performs step 302 and step 303*a*, or performs step 302 and step 303*b*. The first wireless terminal does not perform any one of step 302, step 303*a*, and step 303*b* when the first wireless terminal does not send the second message carrying the first MAC address of the second wireless terminal.

Step 302: The first wireless terminal sends a second message carrying the first MAC address of the second wireless terminal to the second wireless terminal. The second wireless terminal receives the second message that is sent by the first wireless terminal and that carries the first MAC address of the second wireless terminal.

Further, after acquiring the first MAC address of the second wireless terminal, the first wireless terminal may use the first MAC address as a receive address of the sent second message, use a MAC address, currently used by the first wireless terminal, as a sending address to send the second message, that is, adds the first MAC address to a receive address in a MAC message header of the second message, adds a MAC address currently used by the first wireless terminal to a sending address in the MAC message header of the second message, and sends the second message to the second wireless terminal. In this case, the second wireless terminal receives the second message sent by the first wireless terminal.

It should be noted that, when determining, by the second wireless terminal, whether the first MAC address carried in the second message is the same as the current MAC address of the second wireless terminal, that is, a second MAC address, generates different results, different steps are performed. Step 303*a* is performed when the first MAC address carried in the second message is the same as the second MAC address of the second wireless terminal, or step 303*b* is performed when the first MAC address carried in the second message is different from the second MAC address of the second wireless terminal.

Step 303*a*: The second wireless terminal sends a second response message carrying second indication information to the first wireless terminal when the first MAC address carried in the second message is the same as a second MAC address of the second wireless terminal. The first wireless terminal receives the second response message sent by the second wireless terminal and that carries the second indication information.

The second indication information is used to indicate that the first MAC address is the current MAC address of the second wireless terminal.

Further, the second wireless terminal parses out, from the MAC message header of the second message, the first MAC address and the MAC address that is currently used by the first wireless terminal, and determines whether the first MAC address is the MAC address currently used by the second wireless terminal when the second wireless terminal receives the second message that is sent by the first wireless terminal and that carries the first MAC address of the second wireless terminal, and if the first MAC address is not the second MAC address, that is, the first MAC address is not the MAC address currently used by the second wireless terminal, the second wireless terminal does not send the second response message to the first wireless terminal, or sends, to the first wireless terminal, a second response message carrying information indicating that the first MAC address is not the current MAC address of the second wireless terminal, or if the first MAC address is the second MAC address, that is, the first MAC address is the current MAC address of the second wireless terminal, the second wireless terminal sends, to the first wireless terminal, the second response message carrying the second indication information indicating that the first MAC address is the current MAC address of the second wireless terminal. In this case, the first wireless terminal receives the second response message that is sent by the second wireless terminal and that carries the second indication information.

Step 303*b*: The first wireless terminal determines that the current MAC address of the second wireless terminal is not the first MAC address if the first wireless terminal does not receive, within a preset time, the second response message sent by the second wireless terminal and that carries the second indication information.

Further, the first wireless terminal determines whether the second response message that is sent by the second wireless terminal and that carries the second indication information used to indicate that the first MAC address is the current MAC address of the second wireless terminal is received within the preset time, and the first wireless terminal determines that the current MAC address of the second wireless terminal is not the first MAC address if the second response message that is sent by the second wireless terminal and that carries the second indication information used to indicate that the first MAC address is the current MAC address of the second wireless terminal is not received within the preset time.

Step 304: The first wireless terminal sends a first message carrying identifier information. The second wireless terminal receives the first message that is sent by the first wireless terminal and that carries the identifier information.

The identifier information is obtained by the first wireless terminal according to at least the first MAC address, and is different from the first MAC address. The identifier information is identifier information used for the second wireless terminal to verify the first wireless terminal.

It should be noted that the identifier information obtained by the first wireless terminal according to at least the first MAC address includes the following several types.

First type: The identifier information includes first identifier information.

The first identifier information is an M-bit operation result obtained after the first wireless terminal performs a first hash operation on the first MAC address, where M is an integer greater than zero and less than a quantity of bits of the first MAC address.

That is, the first identifier information is an M-bit operation result obtained after the first wireless terminal performs the first hash operation (that is, first uses the first MAC address as input of an input end of the first hash algorithm, and after operation of the first hash algorithm, takes M bits from a result output by an output end of the first hash algorithm) on the first MAC address when the first wireless terminal determines that the current MAC address of the second wireless terminal is not the first MAC address.

It should be noted that, a first hash algorithm is an operation of compressing a message of any length into a message digest of a fixed length.

Exemplarily, it is assumed that M=8 and the used first hash algorithm is SHA-256, the first MAC address is used as input of an input end of the first hash algorithm SHA-256, after operation of the first hash algorithm SHA-256, because the first hash algorithm SHA-256 outputs a 256-bit result, a result output by an output end of the first hash algorithm SHA-256 is of 256 bits, and in this case, the highest eight bits are taken from the output 256 bits, to obtain the first identifier information. That is, the first identifier information=the highest eight bits of SHA-256 (the first MAC address).

It should be noted that, M bits taken by the first wireless terminal from the result output by the output end of the first hash algorithm may be M consecutive bits, or may be M inconsecutive bits, which is not limited in the present disclosure.

It should be noted that, a method for processing, by the first wireless terminal, the first MAC address may also include the first wireless terminal directly takes several bits from the first MAC address according to requirements to obtain the first identifier information, and the hash algorithm is not used for processing. For example, the first identifier information=eight bits of (the first MAC address). The method may also include the first wireless terminal first takes several bits from the first MAC address according to requirements, and then, performs processing using a hash algorithm to obtain the first identifier information. For example, the first identifier information=SHA-256 (eight bits of (the first MAC address)). The method may also include the first wireless terminal performs a particular hash algorithm processing on the first MAC address and one or more specific input values, and then, takes several bits to obtain the first identifier information, which is not limited in the present disclosure.

It should be noted that, persons skilled in the art may understand that, when the first wireless terminal already establishes a communication connection to the second wireless terminal, the first wireless terminal may agree on one or more specific input values in the previous communication connection, and use the one or more specific input values as the information pre-agreed between the first wireless terminal and the second wireless terminal.

Second type: The identifier information includes a third MAC address.

The third MAC address is generated by the first wireless terminal according to first identifier information.

The first identifier information is an M-bit operation result obtained after the first wireless terminal performs the first hash operation on the first MAC address.

Figure 3:
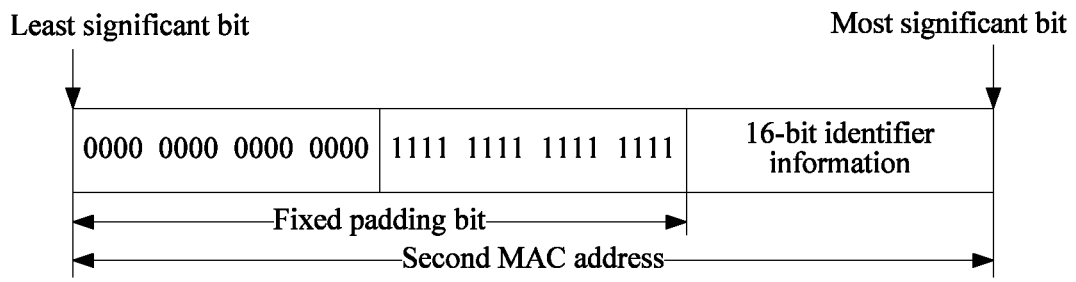
FIG. 3 is a diagram of an example of generating a third MAC address according to an embodiment of the present disclosure.

That is, the third MAC address is generated by the first wireless terminal after the first wireless terminal acquires the first identifier information according to the foregoing method, uses the first identifier information as M bits for constructing the third MAC address, adds fixed characters to the remaining bits of the third MAC address, and combines the first identifier information and the fixed characters. Exemplarily, assuming that M=16, the acquired 16-bit first identifier information may be used as the highest 16 bits of the third MAC address, and fixed characters may be added to the remaining 32 bits, to generate the third MAC address, as shown in FIG. 3.

Third type: The identifier information includes first identifier information and third identifier information.

The first identifier information is an M-bit operation result obtained after the first wireless terminal performs the first hash operation on the first MAC address.

The third identifier information is an N-bit operation result obtained after the first wireless terminal performs a second hash operation on a second random parameter and the first MAC address, where the second random parameter is generated by the first wireless terminal.

That is, the first identifier information is an M-bit operation result obtained after the first wireless terminal performs the first hash operation (that is, first uses the first MAC address as input of an input end of the first hash algorithm, and after processing of the first hash algorithm, takes M bits from a result output by an output end of the first hash algorithm) on the first MAC address when the first wireless terminal determines that the current MAC address of the second wireless terminal is not the first MAC address.

The third identifier information is an N-bit operation result obtained after the first wireless terminal first dynamically generates the second random parameter and performs the second hash operation on the dynamically generated second random parameter and the first MAC address (that is, the first wireless terminal first performs a first operation on the first MAC address and the second random parameter, for example, an additive operation or a subtraction operation, uses a result obtained after the first operation is performed on the second random parameter and the first MAC address as input of an input end of the second hash algorithm, and after processing of the second hash algorithm, takes N bits from a result output by an output end of the second hash algorithm).

Exemplarily, it is assumed that M=8, N=16, the first hash algorithm is SHA-256, the second hash algorithm is SHA-256, and an additive operation is performed on the first MAC address and the second random parameter, the first MAC address is used as an input of the first hash algorithm SHA-256, and after operation of the first hash algorithm SHA-256, because the first hash algorithm SHA-256 outputs a 256-bit result, a result output by an output end of the first hash algorithm SHA-256 is of 256 bits. In this case, the highest eight bits are taken from the output 256 bits, to obtain the first identifier information. The sum of the first MAC address and the second random parameter is used as input of an input end of the second hash algorithm SHA-256, and after operation of the second hash algorithm SHA-256, because the second hash algorithm SHA-256 outputs a 256-bit result, a result output by an output end of the second hash algorithm SHA-256 is of 256 bits. In this case, the highest 16 bits are taken from the output 256 bits, to obtain the third identifier information. That is, the first identifier information=the highest eight bits of SHA-256 (the first MAC address), and the third identifier information=the highest 16 bits of SHA-256 (the first MAC address+the second random parameter).

It should be noted that, the second hash algorithm is an operation of compressing a message of any length into a message digest of a fixed length.

It should be noted that the first random parameter and the second random parameter may also be one or more specific input values pre-agreed in a previous communication connection when the first wireless terminal and the second wireless terminal establish the communication connection previously.

It should be noted that, M bits taken by the first wireless terminal from the result output by the output end of the first hash algorithm may be M consecutive bits, or may also be M inconsecutive bits, and N bits taken by the first wireless terminal from the result output by the output end of the second hash algorithm may be N consecutive bits, or may also be N inconsecutive bits, which is not limited in the present disclosure.

It should be noted that, M and N may be a same value, or may be different values, which is not limited in the present disclosure.

It should be noted that, the first hash algorithm and the second hash algorithm may be a same hash algorithm, or may be different hash algorithms, which is not limited in the present disclosure. In addition, each of the first hash operation and the second hash operation may relate to one or more hash algorithms.

It should be noted that, the present disclosure does not limit a sequence of obtaining the first identifier information and the third identifier information by processing the first MAC address using a preset protocol or rule. The first identifier information may be obtained first and then the third identifier information is obtained, or the third identifier information may be obtained first and the first identifier information is obtained, which is not limited in the present disclosure.

Fourth type: The identifier information includes a fourth MAC address and third identifier information.

The fourth MAC address is generated by the first wireless terminal according to first identifier information.

The first identifier information is an M-bit operation result obtained after the first wireless terminal performs the first hash operation on the first MAC address.

The third identifier information is an N-bit operation result obtained after the first wireless terminal performs the second hash operation on a second random parameter and the first MAC address, where the second random parameter is generated by the first wireless terminal.

That is, the fourth MAC address is generated by the first wireless terminal after the first wireless terminal acquires the first identifier information according to the foregoing method, uses the first identifier information as M bits for constructing the fourth MAC address, adds fixed characters to the remaining bits of the fourth MAC address, and combines the first identifier information and the fixed characters.

The third identifier information is an N-bit operation result obtained after the first wireless terminal first dynamically generates the second random parameter and performs the second hash operation on the dynamically generated second random parameter and the first MAC address (that is, the first wireless terminal first performs a first operation on the first MAC address and the second random parameter, for example, an additive operation or a subtraction operation, uses a result obtained after the first operation is performed on the second random parameter and the first MAC address as input of an input end of the second hash algorithm, and after processing of the second hash algorithm, takes N bits from a result output by an output end of the second hash algorithm).

It should be noted that the fourth MAC address and the third MAC address may be a same MAC address.

Further, according to different content included in the identifier information, the first wireless terminal sends different first messages to the second wireless terminal, and the second wireless terminal receives different first messages sent by the first wireless terminal, which are further as follows.

The first wireless terminal sends the first message carrying the first identifier information when the identifier information includes the first identifier information. The second wireless terminal receives the first message that is sent by the first wireless terminal and that carries the first identifier information.

The first identifier information is an M-bit operation result obtained after the first wireless terminal performs the first hash operation on the first MAC address.

That is, when the identifier information includes the first identifier information, in order not to leak the first MAC address of the second wireless terminal, the first wireless terminal may use a broadcast address as a receive address, use a MAC address, currently used by the first wireless terminal, as a sending address, and adds the first identifier information obtained by processing the first MAC address to the first message and broadcasts the first message such that the second wireless terminal receives the first message.

The first wireless terminal sends the first message carrying a receive address being the third MAC address when the identifier information includes the third MAC address. The second wireless terminal receives the first message that is sent by the first wireless terminal and that carries the receive address being the third MAC address.

The third MAC address is an address that is generated by the first wireless terminal according to the first identifier information, and the third MAC address is a receive address added to the MAC message header of the first message.

That is, when the identifier information includes the third MAC address, in order not to leak the first MAC address of the second wireless terminal, the first wireless terminal uses the third MAC address as the receive address, uses the MAC address, currently used by the first wireless terminal, as the sending address, and adds the third MAC address generated according to the first identifier information to the first message and sends the first message such that the second wireless terminal receives the first message.

The first wireless terminal sends the first message that carries the first identifier information, the third identifier information, and the second random parameter when the identifier information includes the first identifier information and the third identifier information. The second wireless terminal receives the first message that is sent by the first wireless terminal and that carries the first identifier information, the third identifier information, and the second random parameter.

The second random parameter is a parameter generated by the first wireless terminal, and the third identifier information is an N-bit operation result obtained after the first wireless terminal performs the second hash operation on the second random parameter and the first MAC address.

That is, when the identifier information includes the first identifier information and the third identifier information, in order not to leak the first MAC address of the second wireless terminal, the first wireless terminal may use a broadcast address as the receive address, use a MAC address, currently used by the first wireless terminal, as the sending address, and adds the first identifier information and the third identifier information that are obtained by processing the first MAC address, and the dynamically generated second random parameter to the first message and broadcasts the first message such that the second wireless terminal receives the first message.

The first wireless terminal sends the first message that carries the third identifier information, the second random parameter, and a receive address being the fourth MAC address when the identifier information includes the third identifier information and the fourth MAC address. The second wireless terminal receives the first message that is sent by the first wireless terminal and that carries the third identifier information, the second random parameter, and the receive address being the fourth MAC address.

The fourth MAC address is an address that is generated by the first wireless terminal according to the first identifier information, and the fourth MAC address is a receive address added to the MAC message header of the first message.

That is, when the identifier information includes the third identifier information and the fourth MAC address, in order not to leak the first MAC address of the second wireless terminal, the first wireless terminal uses the fourth MAC address as the receive address, uses the MAC address, currently used by the first wireless terminal, as the sending address, and adds the third identifier information obtained by processing the first MAC address, the dynamically generated second random parameter, and the fourth MAC address generated according to the first identifier information to the first message and sends the first message such that the second wireless terminal receives the first message.

It should be noted that, this embodiment of the present disclosure does not limit a method of adding identifier information to a first message. For example, a corresponding identifier information field may be added to a message format of the first message, to dedicatedly carry the identifier information such that after receiving the first message, the second wireless terminal parses out the identifier information from the corresponding field. For example, the first message is a probe request, a corresponding identifier information field is added to a message format of the probe request such that after receiving the probe request message, the second wireless terminal directly parses out the identifier information from the corresponding field. A corresponding identifier information field may also be added to an information element such that after receiving the first message, the second wireless terminal can parse out the identifier information from the corresponding field in the information element.

Figure 4:
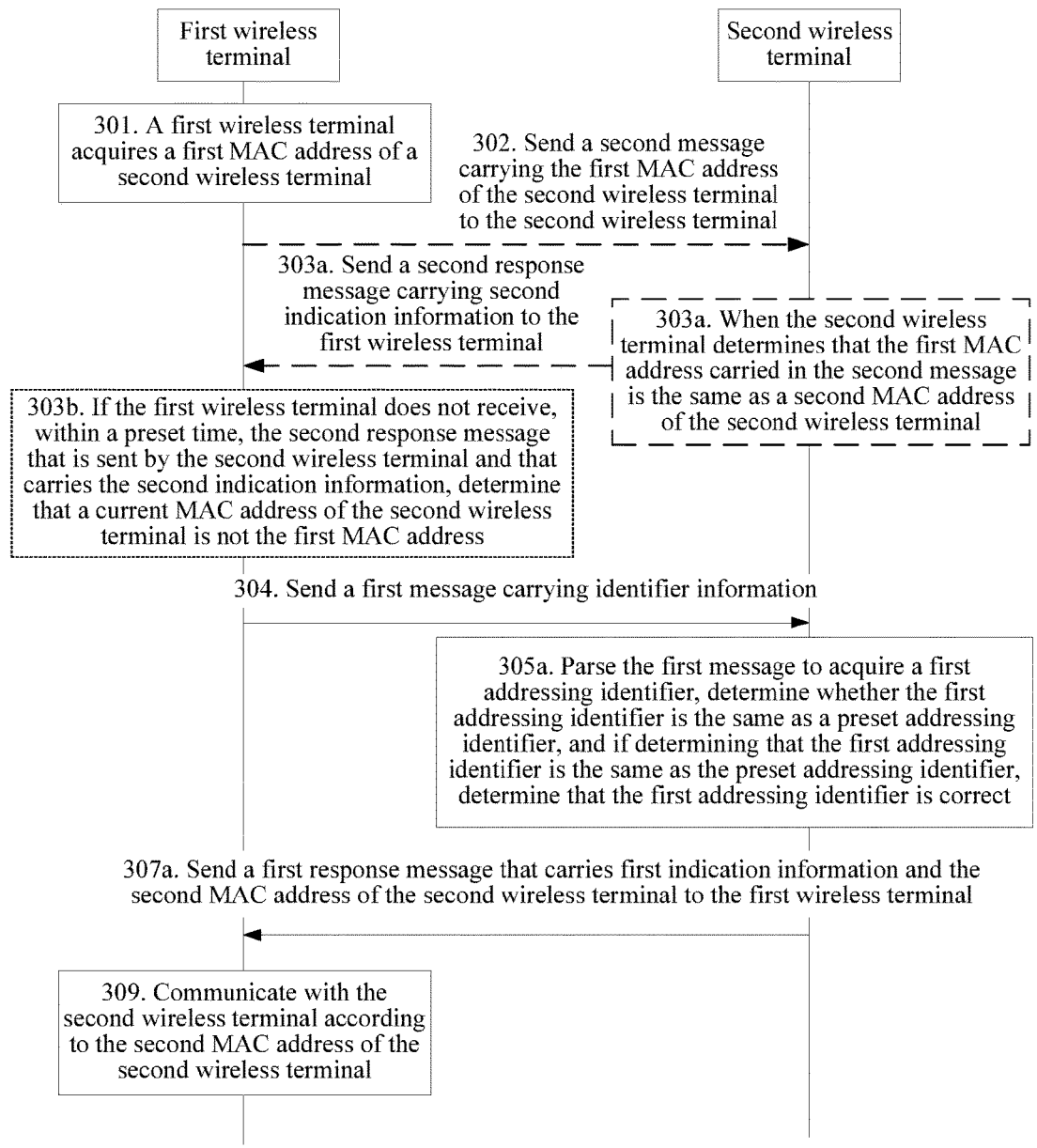
FIG. 4 is a schematic flowchart of another method for establishing a connection by a terminal according to an embodiment of the present disclosure.
Figure 5:
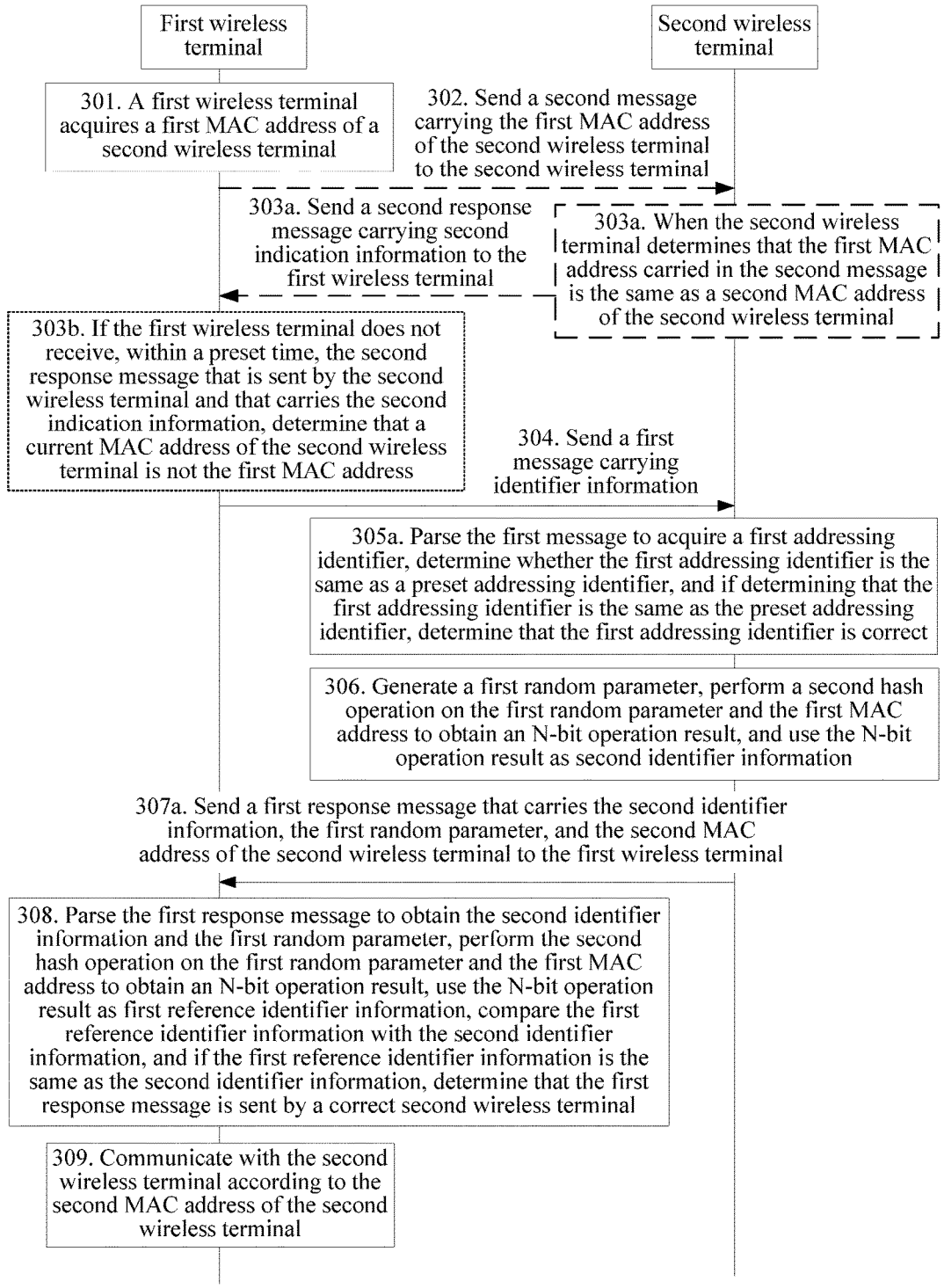
FIG. 5 is a schematic flowchart of another method for establishing a connection by a terminal according to an embodiment of the present disclosure.
Figure 6:
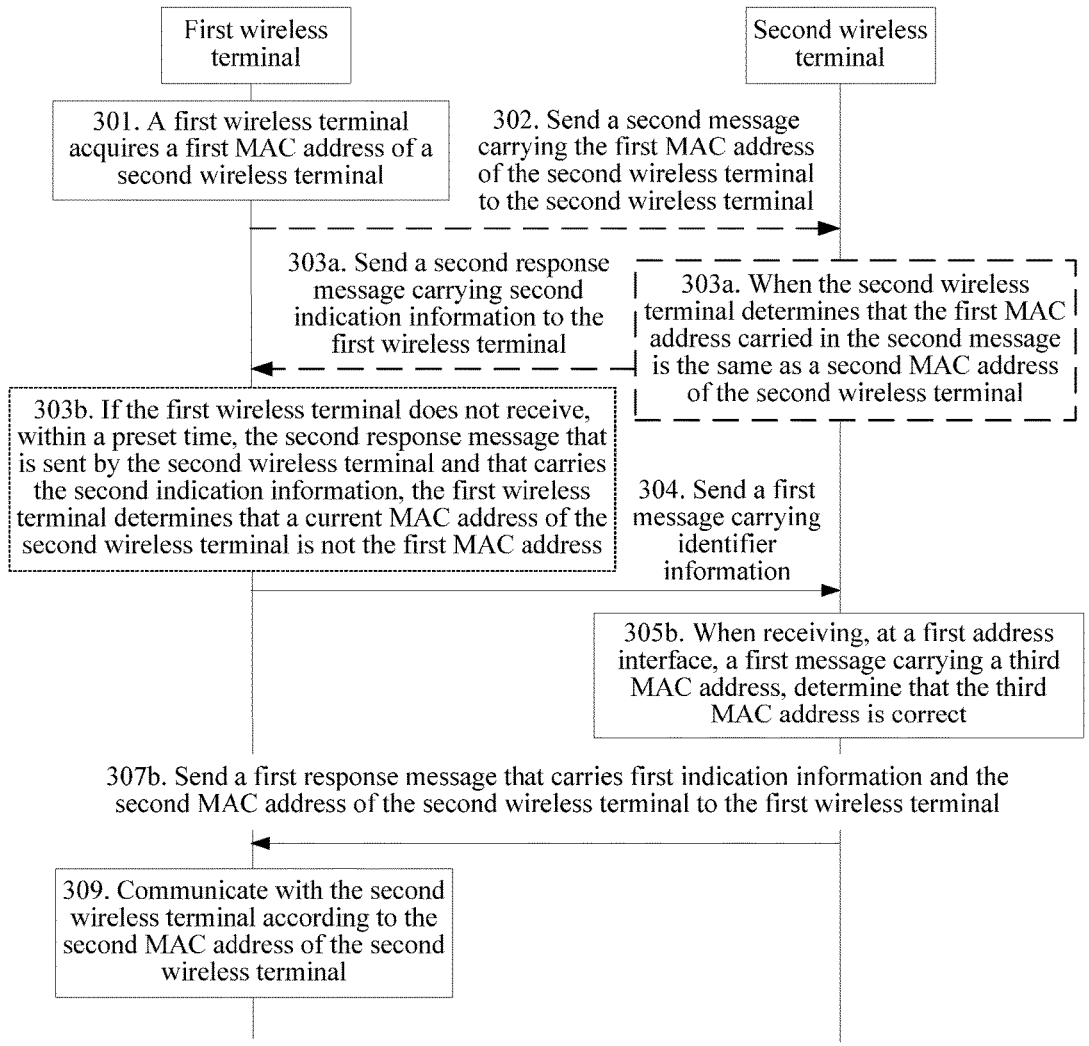
FIG. 6 is a schematic flowchart of another method for establishing a connection by a terminal according to an embodiment of the present disclosure.
Figure 7:
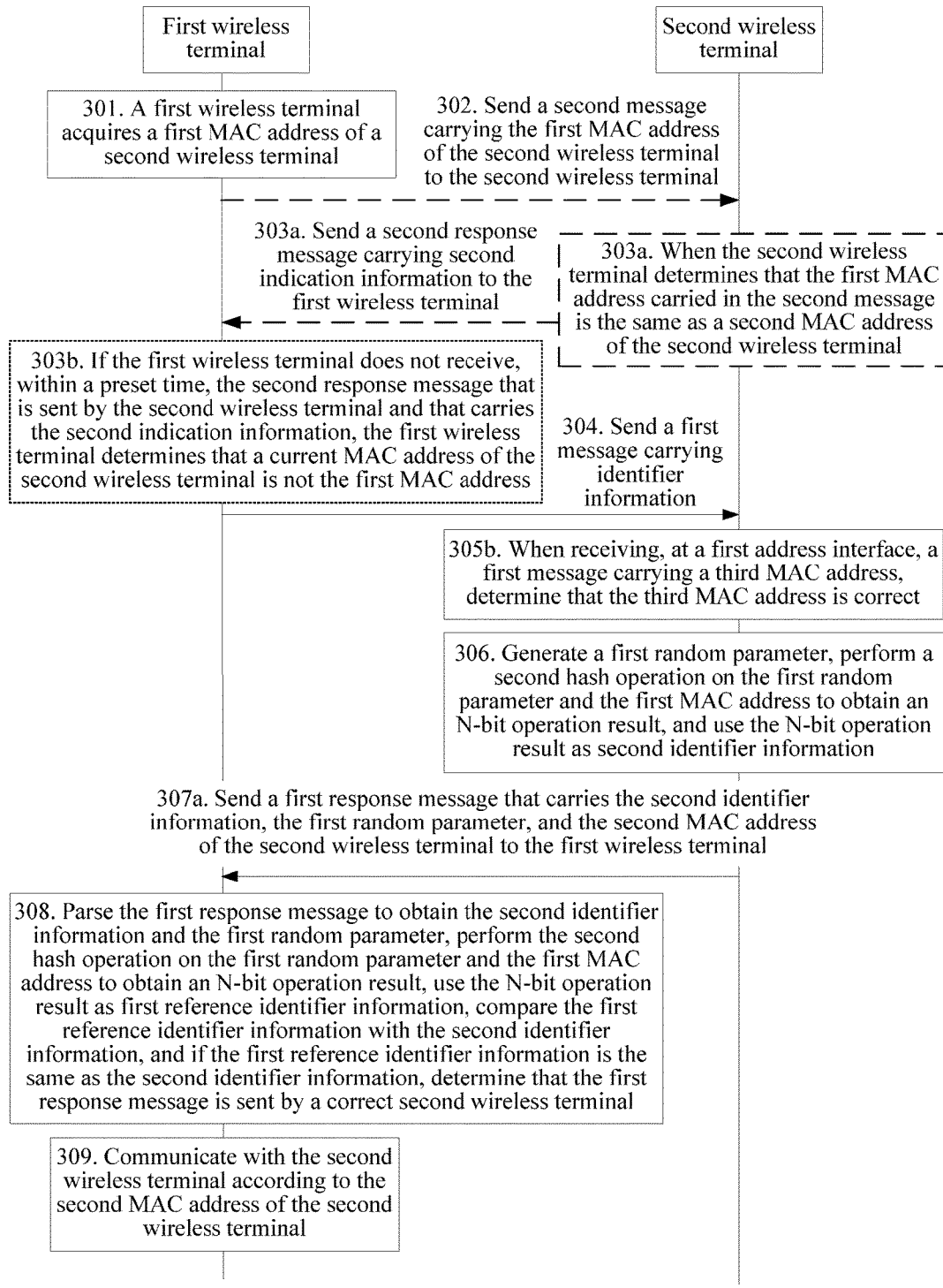
FIG. 7 is a schematic flowchart of another method for establishing a connection by a terminal according to an embodiment of the present disclosure.
Figure 8:
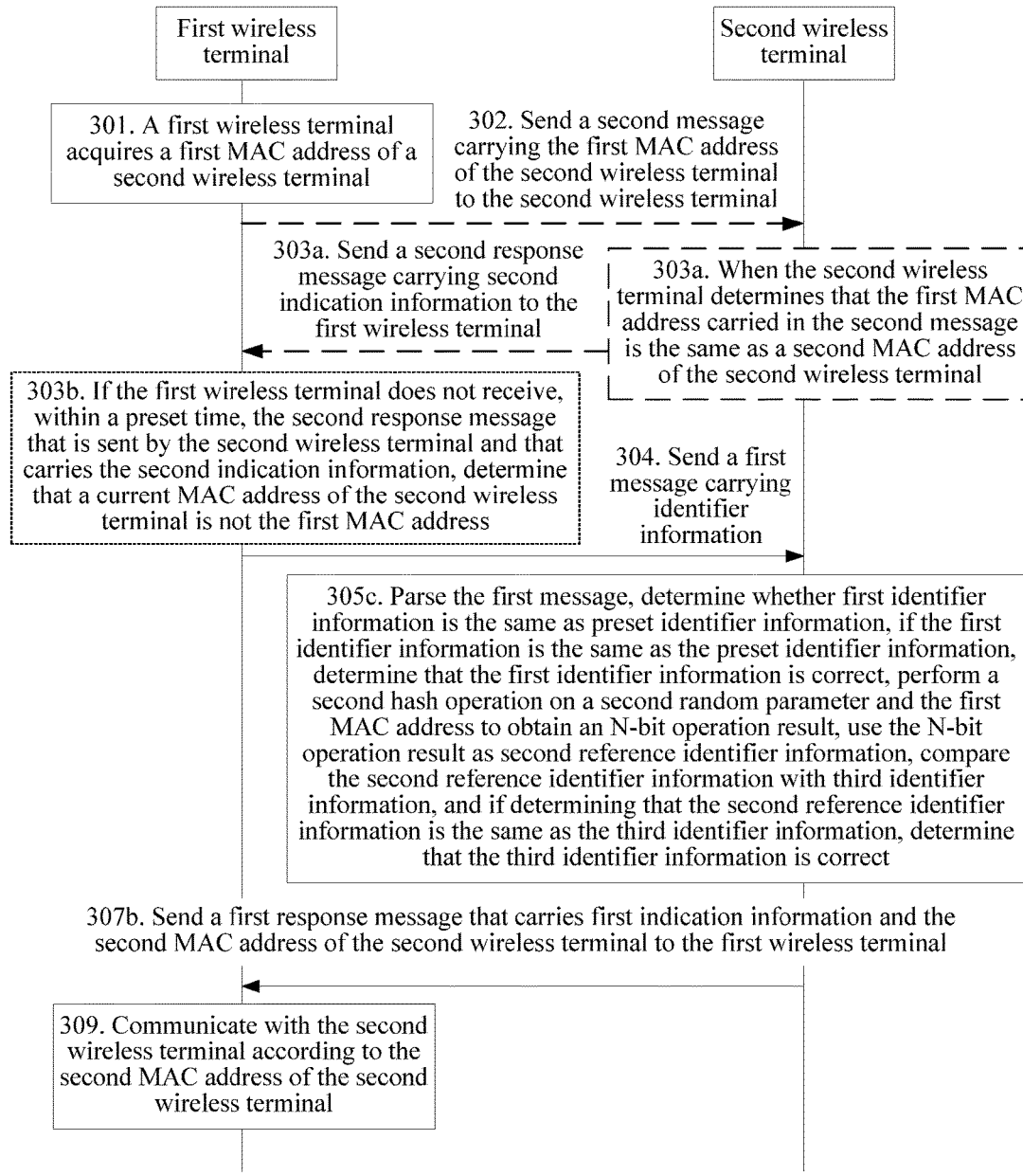
FIG. 8 is a schematic flowchart of another method for establishing a connection by a terminal according to an embodiment of the present disclosure.
Figure 9:
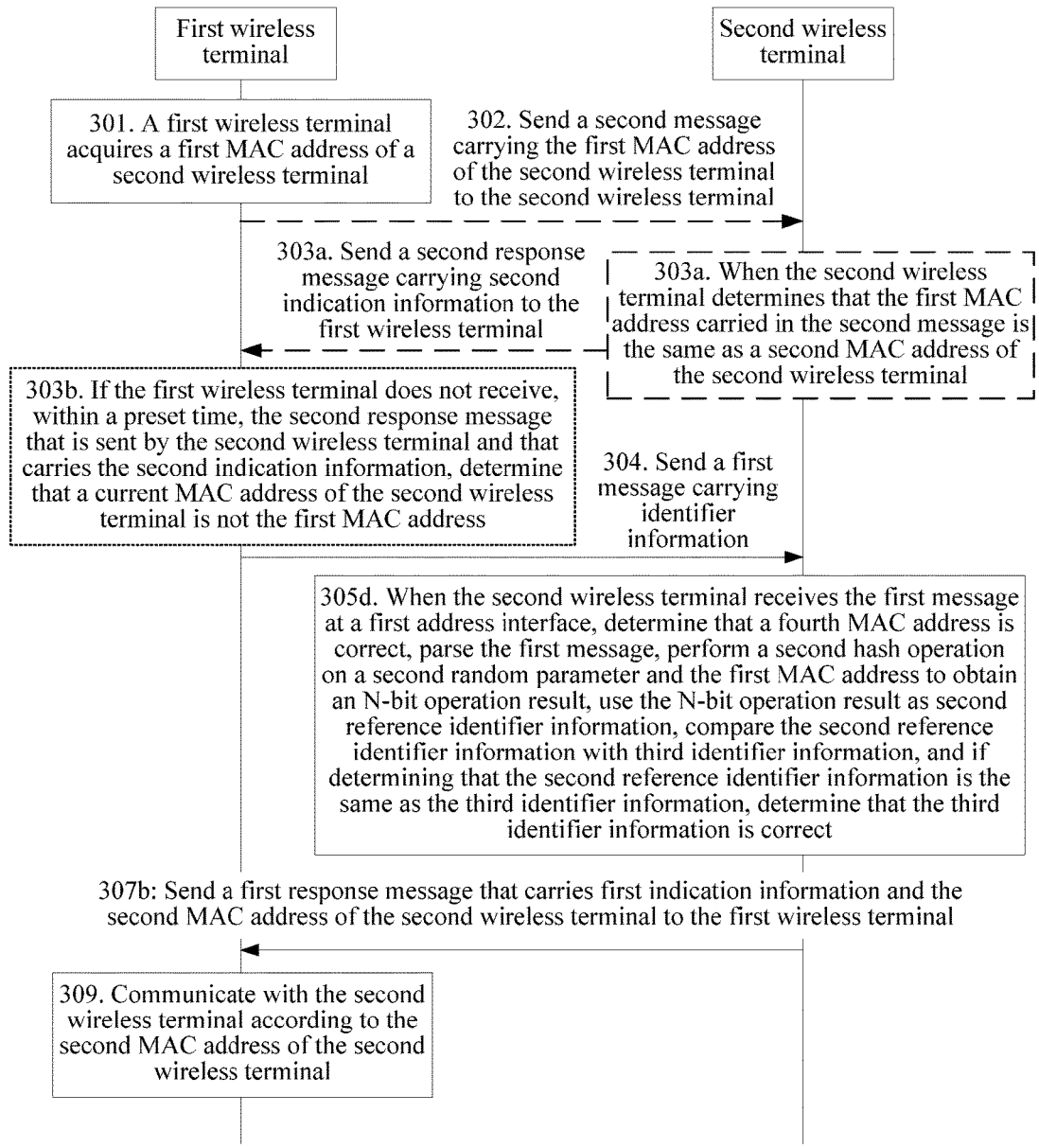
FIG. 9 is a schematic flowchart of another method for establishing a connection by a terminal according to an embodiment of the present disclosure.

It should be noted that, according to different content carried in the received first message, the second wireless terminal may perform different steps. When the second wireless terminal receives the first message that is sent by the first wireless terminal and that carries the first identifier information, the second wireless terminal performs step 305a and step 307b, as shown in FIG. 4, or performs step 305a, step 306, step 307a, and step 308, as shown in FIG. 5. When the second wireless terminal receives the first message sent by the first wireless terminal and that carries the receive address being the third MAC address, the second wireless terminal performs step 305b and step 307b, as shown in FIG. 6, or performs step 305b, step 306, step 307a, and step 308, as shown in FIG. 7. When the second wireless terminal receives the first message sent by the first wireless terminal and that carries the first identifier information, the third identifier information, and the second random parameter, the second wireless terminal performs step 305c and step 307b, as shown in FIG. 8. When the second wireless terminal receives the first message that is sent by the first wireless terminal and that carries the third identifier information, the second random parameter, and the receive address being the fourth MAC address, the second wireless terminal performs step 305d and step 307b, as shown in FIG. 9.

Step 305a: When the second wireless terminal receives the first message sent by the first wireless terminal and that carries first identifier information, the second wireless terminal parses the first message to acquire the first identifier information, determines whether the first identifier information is the same as preset identifier information, and if the first identifier information is the same as the preset identifier information, determines that the first identifier information is correct.

The preset identifier information is an M-bit operation result obtained after the second wireless terminal performs the first hash operation on the first MAC address.

That is, when the second wireless terminal receives the first message that is sent by the first wireless terminal and that carries the first identifier information, the second wireless terminal parses the first message to acquire the first identifier information carried in the first message, compares the first identifier information with an M-bit operation result that is preset by the second wireless terminal and that is obtained after the second wireless terminal performs the first hash operation on the first MAC address, that is, compares the first identifier information with the preset identifier information, and if the preset identifier information is the same as the first identifier information, determines that the first identifier information is correct in order to determine that the first message that is sent by the first wireless terminal and that carries the first identifier information is sent to the second wireless terminal.

It should be noted that, the preset identifier information of the second wireless terminal is identifier information obtained after the second wireless terminal performs a hash operation on the first MAC address of the second wireless terminal, where the hash algorithm used for the processing is the same as the hash algorithm used when the first wireless terminal processes the first MAC address, and a quantity of bits taken from the identifier information obtained after the processing is the same as a quantity of bits of the first identifier information. The quantity of taken bits and the used hash algorithm are set in a communication protocol between the first wireless terminal and the second wireless terminal.

It should be noted that, the second wireless terminal may also not preset the identifier information. The second wireless terminal may compare an M-bit operation result obtained after the hash operation is performed on the first MAC address of the second wireless terminal with the first identifier information after acquiring the first identifier information, which is not limited in the present disclosure.

Step 305b: when the second wireless terminal receives the first message sent by the first wireless terminal and that carries a receive address being a third MAC address, the second wireless terminal determines that the third MAC address is correct when receiving, at a first address interface, the first message carrying the third MAC address.

An address of the first address interface is the same as the third MAC address.

It should be noted that, the address used for the first address interface of the second wireless terminal and the third MAC address of the first wireless terminal are generated according to the protocol preset by the first wireless terminal and the second wireless terminal. That is, the address used for the first address interface of the second wireless terminal includes M-bit preset identifier information and a fixed character.

That is, when the second wireless terminal receives, at the first address interface, the first message carrying the receive address being the third MAC address, the second wireless terminal may determine that the receive address carried in the received first message is the third MAC address, and matches the first address interface in order to determine that the first message is sent to the second wireless terminal.

Step 305c: When the second wireless terminal receives the first message sent by the first wireless terminal and that carries the first identifier information, third identifier information, and a second random parameter, the second wireless terminal parses the first message to acquire the first identifier information, the second random parameter, and the third identifier information, determines whether the first identifier information is the same as the preset identifier information, if the first identifier information is the same as the preset identifier information, determines that the first identifier information is correct, performs a second hash operation on the second random parameter and the first MAC address to obtain an N-bit operation result, uses the N-bit operation result as second reference identifier information, and compares the second reference identifier information with the third identifier information, and if the second reference identifier information is the same as the third identifier information, determines that the third identifier information is correct.

That is, when the second wireless terminal receives the first message that is sent by the first wireless terminal and that carries the first identifier information, the third identifier information, and the second random parameter, the second wireless terminal parses the first message to acquire the first identifier information, the third identifier information, and the second random parameter that are carried in the first message, and compares the first identifier information with an M-bit operation result obtained after the second wireless terminal performs the first hash operation on the first MAC address, that is, compares the first identifier information with the preset identifier information, and if the preset identifier information is the same as the first identifier information, performs next determining, otherwise, the second wireless terminal may determine that the first message is not sent to the second wireless terminal and cancel further determining.

Further, the second wireless terminal performs the second hash operation a result of operating the second random parameter and the first MAC address, that is, the second wireless terminal first performs the first operation on the second random parameter and the first MAC address, uses the result of performing the first operation on the second random parameter and the first MAC address as input of an input end of the second hash algorithm, after the second hash algorithm operation, takes N bits from a result output by an output end of the second hash algorithm to obtain the second reference identifier information, compares the second reference identifier information with the third identifier information, and determines that the third identifier information is correct, and further determines that the first message that is sent by the first wireless terminal and that carries the first identifier information, the third identifier information, and the second random parameter is sent to the second wireless terminal if the second reference identifier information is the same as the third identifier information.

It should be noted that, the first operation performed by the second wireless terminal on the second random parameter and the first MAC address may be any operation, for example, an additive operation or a subtraction operation, which is not limited in the present disclosure.

It should be noted that, the hash algorithm used when the second wireless terminal processes, using the preset protocol or rule, the result of operating the second random parameter and the first MAC address is the same as the hash algorithm used when the first wireless terminal processes the first MAC address and the second random parameter using the preset protocol or rule, and a quantity of bits taken from the processed identifier information is the same as a quantity of bits of the third identifier information, where the quantity of taken bits is preset in a communication protocol between the first wireless terminal and the second wireless terminal.

Step 305d: When the second wireless terminal receives the first message sent by the first wireless terminal and that carries the third identifier information, the second random parameter, and a receive address being a fourth MAC address, when the second wireless terminal receives the first message at a first address interface, the second wireless terminal determines that the fourth MAC address is correct, parses the first message to acquire the third identifier information and the second random parameter, performs the second hash operation on the second random parameter and the first MAC address to obtain an N-bit operation result, uses the N-bit operation result as second reference identifier information, compares the second reference identifier information with the third identifier information, and determines that the third identifier information is correct if the second reference identifier information is the same as the third identifier information.

An address of the first address interface is the same as the fourth MAC address.

That is, when the second wireless terminal receives, at the first address interface, the first message that carries the third identifier information, the second random parameter, and the receive address being the fourth MAC address, the second wireless terminal may determine that the receive address carried in the received first message is the fourth MAC address, and matches the first address interface.

Further, the second wireless terminal parses the first message to acquire the third identifier information and the second random parameter, performs the second hash operation on the acquired second random parameter and the first MAC address, that is, the second wireless terminal first performs the first operation on the second random parameter and the first MAC address, uses the result of performing the first operation on the second random parameter and the first MAC address as input of an input end of the second hash algorithm, after the second hash algorithm operation, takes N bits from a result output by an output end of the second hash algorithm to obtain the second reference identifier information, compares the second reference identifier information with the third identifier information, and determines that the third identifier information is correct, and further determines that the first message that is sent by the first wireless terminal and that carries the first identifier information, the third identifier information, and the second random parameter is sent to the second wireless terminal if the second reference identifier information is the same as the third identifier information.

Step 306: The second wireless terminal generates a first random parameter, performs the second hash operation on the first random parameter and the first MAC address to obtain an N-bit operation result, and sets the N-bit operation result as second identifier information.

Further, when the second wireless terminal determines that the first identifier information is the same as the preset identifier information, to further determine that the first message sent by the first wireless terminal and that carries the first identifier information is sent to the second wireless terminal, the second wireless terminal needs to dynamically generate a first random parameter, performs the first hash operation on the dynamically generated first random parameter and the first MAC address, that is, first performs the first operation on the first random parameter and the first MAC address, for example, an additive operation or a subtraction operation, then, uses a result of performing the first operation on the first random parameter and the first MAC address as input of an input end of the second hash algorithm, and after the second hash algorithm operation, takes N bits from a result output by an output end of the second hash algorithm, to obtain the second identifier information.

Exemplarily, it is assumed that N=16, the second hash algorithm is SHA-256, and an additive operation is performed on the first MAC address and the first random parameter, the sum of the first MAC address and the first random parameter is used as input of an input end of the second hash algorithm SHA-256, and after operation of the second hash algorithm SHA-256, because the second hash algorithm SHA-256 outputs a 256-bit result, a result output by an output end of the second hash algorithm SHA-256 is of 256 bits. In this case, the highest 16 bits are taken from the output 256 bits, to obtain the second identifier information. That is, the second identifier information=the highest 16 bits of SHA-256 (the first MAC address+the first random parameter).

Step 307*a*: The second wireless terminal sends a first response message that carries the second identifier information, the first random parameter, and the second MAC address of the second wireless terminal to the first wireless terminal. The first wireless terminal receives the first response message that is sent by the second wireless terminal and that carries the second identifier information, the first random parameter, and the second MAC address of the second wireless terminal.

The second MAC address is a current MAC address of the second wireless terminal, and the second identifier information is an N-bit operation result obtained after the second wireless terminal performs the second hash operation on the first random parameter and the first MAC address.

Further, when the second wireless terminal receives the first message sent by the first wireless terminal and that carries the first identifier information, or when the second wireless terminal receives the first message that is sent by the first wireless terminal and that carries the receive address being the third MAC address, when the second wireless terminal determines that the first messages sent by the first wireless terminal is correct, in order to further determine that the first message sent by the first wireless terminal is sent to the second wireless terminal, the second wireless terminal uses the MAC address, currently used by the second wireless terminal, as the sending address, and sends the first response message that carries the second identifier information, the first random parameter, and the second MAC address of the second wireless terminal to the first wireless terminal such that after receiving the first response message that carries the second identifier information, the first random parameter, and the second MAC address of the second wireless terminal, the first wireless terminal verifies the second identifier information in order to further prove that the first message is sent to the correct second wireless terminal. Because when the second wireless terminal sends the first response message to the first wireless terminal, the second wireless terminal does not use the first MAC address of the second wireless terminal as the sending address, and instead, uses the MAC address, currently used by the second wireless terminal, as the receive address, the first MAC address of the second wireless terminal is not leaked.

Step 307*b*: The second wireless terminal sends a first response message that carries first indication information and the second MAC address of the second wireless terminal to the first wireless terminal. The first wireless terminal receives a first response message that is sent by the second wireless terminal and that carries the first indication information and the second MAC address of the second wireless terminal.

The first indication information is used to indicate that the verification succeeds.

Further, when the second wireless terminal determines that the first identifier information and the third identifier information or the third MAC address used as the receive address and the third identifier information that are carried in the received first message are correct, the second wireless terminal sends the first response message carrying the first indication information used to indicate that the verification succeeds to the first wireless terminal, in this case, after receiving the first response message sent by the second wireless terminal, the first wireless terminal acquires the first indication information indicating that the verification succeeds in order to determine that the first response message is sent by the correct second wireless terminal.

Step 308: The first wireless terminal parses the first response message to obtain the second identifier information and the first random parameter, performs the second hash operation on the first random parameter and the first MAC address to obtain an N-bit operation result, sets the N-bit operation result as first reference identifier information, compares the first reference identifier information with the second identifier information, and determines that the first response message is sent by the correct second wireless terminal if the first reference identifier information is the same as the second identifier information.

Further, when the first wireless terminal obtains the first identifier information, or in a case in which the first wireless terminal obtains the third MAC address, after receiving the first response message sent by the second wireless terminal, the first wireless terminal parses the first response message to acquire the second identifier information and the first random parameter, performs the second hash operation on a result of operating the first random parameter and the first MAC address, that is, first performs the first operation on the first random parameter and the first MAC address, uses the result of the first operation as input of an input end of the second hash algorithm, after the operation of the second hash algorithm, takes N bits from the result output by the output end of the second hash algorithm to obtain the first reference identifier information, compares the first reference identifier information with the third identifier information, and the first wireless terminal determines that the first response message is sent by the correct second wireless terminal, and further communicates with the second wireless terminal, thereby ensuring that the first wireless terminal can normally communicate with the second wireless terminal if the first reference identifier information is the same as the third identifier information.

Step 309: The first wireless terminal communicates with the second wireless terminal according to the second MAC address of the second wireless terminal.

Further, when receiving the first response message sent by the second wireless terminal, the first wireless terminal parses the first response message, to acquire the second MAC address of the second wireless terminal, that is, the current MAC address of the second wireless terminal such that when needing to communicate with the second wireless terminal, the first wireless terminal may use the current MAC address of the second wireless terminal as a receive address when the first wireless terminal sends a message to the second wireless terminal, and uses the current MAC address of the first wireless terminal as a sending address to send a message to the second wireless terminal. In this way, it may be ensured that the first wireless terminal can normally communicate with the second wireless terminal.

In the method for establishing a connection by a terminal provided in this embodiment of the present disclosure, after acquiring a first MAC address of a second wireless terminal, a first wireless terminal obtains, according to at least the first MAC address, identifier information different from the first MAC address, and sends a first message carrying the identifier information such that the second wireless terminal receives the first message, parses the first message to acquire the identifier information carried in the first message, verifies whether the acquired identifier information is correct, and when the acquired identifier information is correct, sends a first response message carrying a second MAC address of the second wireless terminal to the first wireless terminal such that after receiving the first response message that is sent by the second wireless terminal and that carries the second MAC address of the second wireless terminal, the first wireless terminal may acquire the second MAC address of the second wireless terminal, that is, a current MAC address of the second wireless terminal, and further communicate with the second wireless terminal. Because the identifier information is carried in the first message sent by the first wireless terminal, an eavesdropper cannot eavesdrop on the first MAC address of the second wireless terminal. Meanwhile, the second wireless terminal verifies the identifier information, and when determining that the identifier information is obtained according to the first MAC address of the second wireless terminal, sends the first response message to the first wireless terminal, to notify the first wireless terminal of the current MAC address of the second wireless terminal. Therefore, when a MAC address of the second wireless terminal is changed, not only it is ensured that the second wireless terminal is not eavesdropped on, but also the first wireless terminal can normally communicate with the second wireless terminal.

Figure 10:
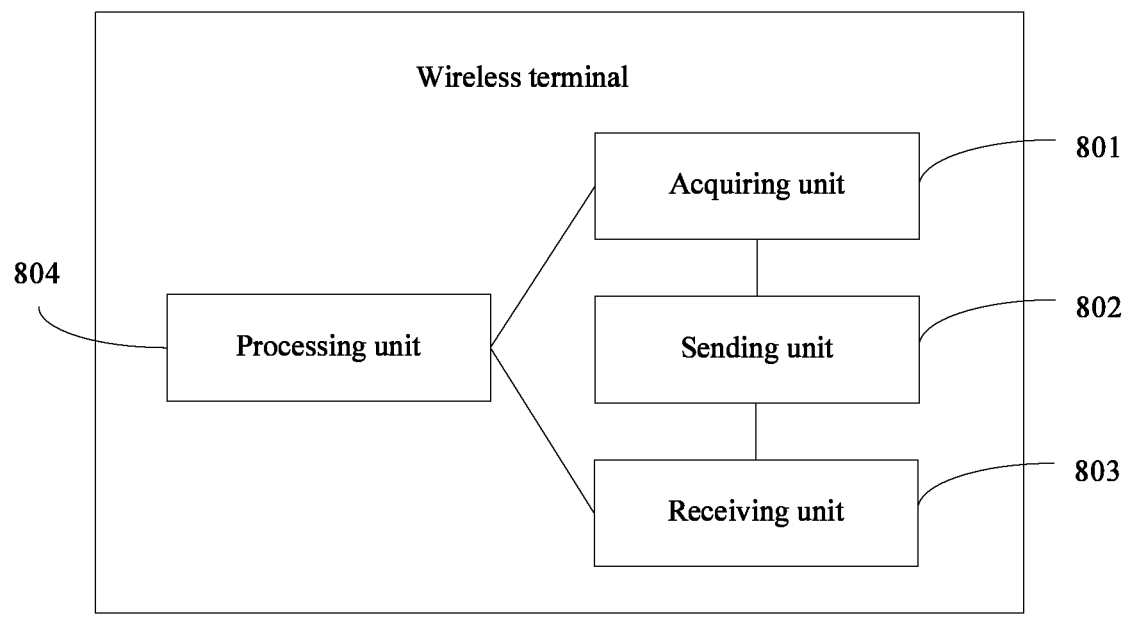
FIG. 10 is a schematic functional diagram of a wireless terminal according to an embodiment of the present disclosure.

FIG. 10 is a schematic functional diagram of a wireless terminal according to an embodiment of the present disclosure, applied to a scenario of communication based on a WLAN. As shown in FIG. 10, the wireless terminal includes an acquiring unit 801, a sending unit 802, a receiving unit 803, and a processing unit 804.

The acquiring unit 801 is configured to acquire a first MAC address of a second wireless terminal.

Further, acquiring, by the acquiring unit 801, a first MAC address of a second wireless terminal may include acquiring, from a memory of the wireless terminal, the previously stored first MAC address of the second wireless terminal, or may include acquiring the first MAC address of the second wireless terminal using the following several methods.

In a first method, the acquiring unit 801 may acquire the first MAC address of the second wireless terminal using another channel except a Wi-Fi channel.

For example, the acquiring unit 801 first scans a two-dimensional barcode in which the first MAC address of the second wireless terminal is coded, and parses the acquired two-dimensional barcode, to acquire the first MAC address included in the two-dimensional barcode.

Alternatively, when the wireless terminal is very close to the second wireless terminal, the acquiring unit 801 may directly acquire the first MAC address of the second wireless terminal using an NFC interface of the second wireless terminal.

Alternatively, when a user knows the first MAC address of the second wireless terminal, the user enters the first MAC address of the second wireless terminal through a user interface such that the acquiring unit 801 acquires the first MAC address of the second wireless terminal.

In a second method, the acquiring unit 801 acquires the first MAC address of the second wireless terminal in a manner in which the receiving unit 803 receives a message sent by the second wireless terminal.

For example, the acquiring unit 801 receives, using the receiving unit 803, a probe request message that is broadcast by the second wireless terminal at a particular period and that carries the first MAC address of the second wireless terminal, and parses the probe request message to acquire the first MAC address of the second wireless terminal.

It should be noted that, the acquiring unit 801 may also acquire the first MAC address of the second wireless terminal in another manner, for example, the acquiring unit 801 may receive, using the receiving unit 803, a message that is sent by another device different from the second wireless terminal and that carries the first MAC address of the second wireless terminal, and parse the message to acquire the first MAC address of the second wireless terminal, which is not limited in the present disclosure.

It should be noted that, when the wireless terminal communicates with the second wireless terminal, the wireless terminal may be a device supporting Wi-Fi, for example, a mobile phone device, and the second wireless terminal is a wireless AP, or the wireless terminal is a wireless AP, and the second wireless terminal is a device supporting Wi-Fi, or both the wireless terminal and the second wireless terminal are devices supporting Wi-Fi, which is not limited in the present disclosure.

The sending unit 802 is configured to send a first message carrying identifier information such that the second wireless terminal receives the first message and verifies the identifier information.

The identifier information is obtained by the wireless terminal according to at least the first MAC address, and is different from the first MAC address. The identifier information is identifier information used for the second wireless terminal to verify the wireless terminal.

Further, after the processing unit 804 acquires the first MAC address of the second wireless terminal, in order not to leak the first MAC address of the second wireless terminal, the processing unit 804 processes the first MAC address or the first MAC address and the information that is pre-agreed between the first wireless terminal and the second wireless terminal, for example, performs a proper hash operation on the first MAC address, such as SHA-256, SHA-1, or MD-5 processing, to obtain the identifier information, adds the identifier information to the first message, and sends the first message using the sending unit 802.

For a specific manner of sending the first message, when a receive address in a MAC message header of the first message has different content, sending manners are also different.

For example, the sending unit 802 broadcasts the first message if the receive address in the MAC message header of the first message is a broadcast address, or the sending unit 802 sends the first message in a unicast manner if the receive address in the MAC message header of the first message is a MAC address generated according to the identifier information.

In this way, when receiving the first message sent by the wireless terminal, the second wireless terminal parses the first message to acquire the identifier information carried in the first message, compares the identifier information obtained after the first MAC address is processed according to a preset rule or protocol between the wireless terminal and the second wireless terminal with the acquired identifier information, and determines that the acquired identifier information is correct if the identifier information obtained after the first MAC address is processed is the same as the acquired identifier information, or determines that the acquired identifier information is incorrect if the identifier information obtained after the first MAC address is processed is different from the acquired identifier information. In this way, the second wireless terminal may determine, according to whether the identifier information is correct, whether to send a response message to the wireless terminal.

It should be noted that, when the sending unit 802 sends the first message carrying the identifier information, a used sending address is a MAC address used when the wireless terminal currently sends a message, that is, the MAC address currently used by the wireless terminal is added to a sending address in the MAC message header of the first message.

The receiving unit 803 is configured to receive a first response message that is sent by the second wireless terminal and that carries a second MAC address of the second wireless terminal.

The second MAC address is a current MAC address of the second wireless terminal, and the first response message is a message that is sent by the second wireless terminal after the second wireless terminal successfully verifies the identifier information.

Further, after the receiving unit 803 receives the first response message that is sent by the second wireless terminal and that carries the second MAC address of the second wireless terminal, the processing unit 804 determines that verification on the sent first message carrying the identifier information succeeds, and may acquire the second MAC address of the second wireless terminal by parsing the first response message, that is, acquire the current MAC address of the second wireless terminal, to further transmit data to the second wireless terminal using the current MAC address of the second wireless terminal.

It should be noted that, the current MAC address of the second wireless terminal is a MAC address used when the second wireless terminal currently sends a message.

The processing unit 804 is further configured to communicate with the second wireless terminal according to the second MAC address of the second wireless terminal received by the receiving unit 803.

Further, after the receiving unit 803 receives the first response message sent by the second wireless terminal, the processing unit 804 parses the first response message, to acquire the second MAC address of the second wireless terminal, that is, the current MAC address of the second wireless terminal such that when needing to communicate with the second wireless terminal, the wireless terminal may use the current MAC address of the second wireless terminal as a receive address when the first wireless terminal sends a message to the second wireless terminal, and uses the current MAC address of the wireless terminal as a sending address to send a message to the second wireless terminal. In this way, it may be ensured that the wireless terminal can normally communicates with the second wireless terminal.

Further, the identifier information obtained by the processing unit 804 according to at least the first MAC address includes the following several types.

First type: The identifier information includes first identifier information.

The first identifier information is an M-bit operation result obtained after the processing unit 804 performs a first hash operation on the first MAC address acquired by the acquiring unit 801, where M is an integer greater than zero and less than a quantity of bits of the first MAC address.

Second type: The identifier information includes a third MAC address.

The third MAC address is generated by the processing unit 804 according to first identifier information.

The first identifier information is an M-bit operation result obtained after the processing unit 804 performs a first hash operation on the first MAC address acquired by the acquiring unit 801.

Third type The identifier information includes first identifier information and third identifier information.

The first identifier information is an M-bit operation result obtained after the processing unit 804 performs a first hash operation on the first MAC address acquired by the acquiring unit 801.

The third identifier information is an N-bit operation result obtained after the processing unit 804 performs a second hash operation on a second random parameter and the first MAC address.

The second random parameter is generated by the processing unit 804.

Fourth type: The identifier information includes a fourth MAC address and third identifier information.

The fourth MAC address is generated by the processing unit 804 according to first identifier information.

The first identifier information is an M-bit operation result obtained after the processing unit 804 performs a first hash operation on the first MAC address acquired by the acquiring unit 801.

The third identifier information is an N-bit operation result obtained after the processing unit 804 performs a second hash operation on a second random parameter and the first MAC address.

The second random parameter is generated by the processing unit 804.

Further, according to different content included in the identifier information, the sending unit 802 sends different first messages, and the content received by the receiving unit 803 are different, which are as follows.

The sending unit 802 is further configured to send the first message carrying the first identifier information when the identifier information includes the first identifier information.

The sending unit 802 is further configured to send the first message carrying a receive address being the third MAC address generated by the processing unit 804 when the identifier information includes the third MAC address.

The third MAC address is a receive address added to the MAC message header of the first message.

The sending unit 802 is further configured to send the first message that carries the first identifier information, the second identifier information, and the second random parameter when the identifier information includes the first identifier information and the third identifier information.

The sending unit 802 is further configured to send the first message that carries the third identifier information, the second random parameter, and a receive address being the fourth MAC address generated by the processing unit 804 when the identifier information includes the fourth MAC address and the third identifier information.

The fourth MAC address is a receive address added to the MAC message header of the first message.

It should be noted that the fourth MAC address and the third MAC address may be a same MAC address.

The receiving unit 803 is further configured to receive the first response message sent by the second wireless terminal and that carries the second identifier information, the first random parameter, and the second MAC address of the second wireless terminal.

The second identifier information is an N-bit operation result obtained after the second wireless terminal performs the second hash operation on the first random parameter and the first MAC address, where N is an integer greater than zero and less than a quantity of bits of the first MAC address.

The processing unit 804 is further configured to parse the first response message received by the receiving unit 803 to acquire the second identifier information and the first random parameter, perform the second hash operation on the first random parameter and the first MAC address to obtain an N-bit operation result, set the N-bit operation result as first reference identifier information, and compare the first reference identifier information with the second identifier information, and determine that the first response message is sent by the correct second wireless terminal if the first reference identifier information is the same as the second identifier information.

Alternatively, the receiving unit 803 is configured to receive a first response message sent by the second wireless terminal and that carries first indication information and the second MAC address of the second wireless terminal.

The first indication information is used to indicate that the verification succeeds.

The receiving unit 803 is further configured to receive the first response message sent by the second wireless terminal and that carries the first indication information and the second MAC address of the second wireless terminal when the identifier information includes the first identifier information and the third identifier information, or when the identifier information includes the fourth MAC address and the third identifier information.

Further, the sending unit 802 is further configured to send the second message carrying the first MAC address of the second wireless terminal to the second wireless terminal, and the processing unit 804 is further configured to determine that a current MAC address of the second wireless terminal is not the first MAC address when the receiving unit 803 does not receive, within a preset time, a second response message sent by the second wireless terminal and that carries second indication information, where the second indication information is used to indicate that the first MAC address is a current MAC address of the second wireless terminal.

In the wireless terminal provided in this embodiment of the present disclosure, after acquiring a first MAC address of a second wireless terminal, the wireless terminal obtains identifier information through derivation according to at least the first MAC address, and sends a first message carrying the identifier information such that the second wireless terminal receives the first message, parses the first message to acquire the identifier information carried in the first message, verifies whether the acquired identifier information is correct, and when determining that the acquired identifier information is correct, sends a first response message carrying a second MAC address of the second wireless terminal to the wireless terminal. When receiving the first response message carrying the second MAC address of the second wireless terminal, the wireless terminal may acquire the second MAC address of the second wireless terminal, and use the second MAC address of the second wireless terminal, that is, a current MAC address of the second wireless terminal, as a receive address of a message sent by the wireless terminal, and further communicate with the second wireless terminal. Because the identifier information is carried in the first message sent by the wireless terminal, an eavesdropper cannot eavesdrop on the first MAC address of the second wireless terminal. Meanwhile, the second wireless terminal verifies the identifier information, and when the identifier information is obtained according to the first MAC address of the second wireless terminal, sends the first response message to the wireless terminal, to notify the wireless terminal of the current MAC address of the second wireless terminal. Therefore, in a case in which a MAC address of the second wireless terminal is changed, not only it is ensured that the second wireless terminal is not eavesdropped on, but also the wireless terminal can normally communicate with the second wireless terminal.

Figure 11:
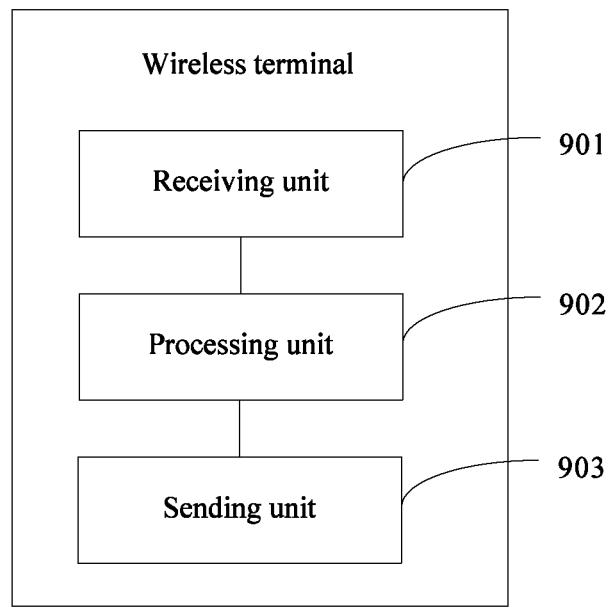
FIG. 11 is a schematic functional diagram of another wireless terminal according to an embodiment of the present disclosure.

FIG. 11 is a schematic functional diagram of a wireless terminal according to an embodiment of the present disclosure, applied to a scenario of communication based on a WLAN. As shown in FIG. 11, the wireless terminal includes a receiving unit 901, a processing unit 902, and a sending unit 903.

The receiving unit 901 is configured to receive a first message that is sent by a first wireless terminal and that carries identifier information.

The identifier information is obtained by the first wireless terminal after the first wireless terminal acquires a first MAC address of the wireless terminal and through derivation according to at least the first MAC address, and is different from the first MAC address. The identifier information is identifier information used for the wireless terminal to verify the first wireless terminal.

The processing unit 902 is configured to determine whether the identifier information carried in the first message received by the receiving unit 901 is correct.

Further, after the receiving unit 901 receives the first message sent by the first wireless terminal and that carries the identifier information, the processing unit 902 parses the first message, acquires the identifier information carried in the first message and a MAC address currently used by the first wireless terminal, processes the first MAC address according to a preset rule or protocol between the first wireless terminal and the wireless terminal, to obtain the identifier information, and compares the identifier information obtained by processing the first MAC address according to the preset rule or protocol between the first wireless terminal and the wireless terminal with the acquired identifier information, and determines that the acquired identifier information is correct if the identifier information obtained by processing the first MAC address according to the preset rule or protocol between the first wireless terminal and the wireless terminal is the same as the acquired identifier information, or determines that the acquired identifier information is incorrect if the identifier information obtained by processing the first MAC address according to the preset rule or protocol between the first wireless terminal and the wireless terminal is different from the acquired identifier information.

The sending unit 903 is configured to send a first response message carrying a second MAC address of the wireless terminal to the first wireless terminal when the processing unit 902 determines that the identifier information carried in the first message is correct, where the second MAC address is a current MAC address of the second wireless terminal.

Further, when the processing unit 902 determines that the identifier information carried in the first message is correct, the sending unit 903 uses the MAC address currently used by the wireless terminal, that is, the second MAC address, as a sending address to send the first response message, uses a MAC address currently used by the first wireless terminal as a receive address of the sent first response message, and sends the first response message to the first wireless terminal.

The receiving unit 901 is further configured to receive the first message sent by the first wireless terminal and that carries the identifier information, where the first identifier information is an M-bit operation result obtained after the first wireless terminal performs a first hash operation on the first MAC address, and M is an integer greater than zero and less than a quantity of bits of the first MAC address, or the receiving unit 901 is further configured to receive the first message sent by the first wireless terminal and that carries the first identifier information, the third identifier information, and a second random parameter, where the second random parameter is a parameter generated by the first wireless terminal, and the third identifier information is an N-bit operation result obtained after the first wireless terminal performs a second hash operation on the second random parameter and the first MAC address, where N is an integer greater than zero and less than a quantity of bits of the first MAC address, or the receiving unit 901 is further configured to receive the first message sent by the first wireless terminal and that carries a receive address being a third MAC address, where the third MAC address is generated by the first wireless terminal according to the first identifier information, and the third MAC address is a receive address added to a MAC message header of the first message, or the receiving unit 901 is further configured to receive the first message that is sent by the first wireless terminal and that carries the third identifier information, the second random parameter, and a receive address being a fourth MAC address, where the fourth MAC address is generated by the first wireless terminal according to the first identifier information, and the fourth MAC address is a receive address added to a MAC message header of the first message.

It should be noted that the fourth MAC address and the third MAC address may be a same MAC address.

It should be noted that, according to different content carried in the first message received by the receiving unit 901, methods in which the processing unit 902 determines whether the content carried in the first message is correct are different, content sent by the sending unit 903 is also different, and content carried in the first message received by the receiving unit 901 is also different.

The processing unit 902 is further configured to parse the first message to acquire the first identifier information, and determine whether the first identifier information is the same as preset identifier information when the receiving unit 901 receives the first message carrying the first identifier information, and determine that the first identifier information is correct if the first identifier information is the same as the preset identifier information, where the preset identifier information is an M-bit operation result obtained after the wireless terminal performs the first hash operation on the first MAC address.

The processing unit 902 is further configured to determine that the third MAC address is correct when the receiving unit 901 receives the first message carrying the receive address being the third MAC address, when the receiving unit 901 receives, at a first address interface, the first message sent by the first wireless terminal, where an address of the first address interface is the same as the third MAC address.

The processing unit 902 is further configured to generate a first random parameter, perform the second hash operation on the first random parameter and the first MAC address to obtain an N-bit operation result, and set the N-bit operation result as second identifier information, and the sending unit 903 is further configured to send the first response message that carries the first random parameter, the second MAC address of the wireless terminal, and the second identifier information obtained by the processing unit 902 to the first wireless terminal.

The processing unit 902 is further configured to parse the first message to acquire the first identifier information, the second random parameter, and the third identifier information, and determine whether the first identifier information is the same as the preset identifier information when the receiving unit 901 receives the first message that carries the first identifier information, the third identifier information, and the second random parameter, and determine that the first identifier information is correct, perform the second hash operation on the second random parameter and the first MAC address to obtain an N-bit operation result, set the N-bit operation result as second reference identifier information, and compare the second reference identifier information with the third identifier information if the first identifier information is the same as the preset identifier information, and determine that the third identifier information is correct if the second reference identifier information is the same as the third identifier information, where the preset identifier information is an M-bit operation result obtained after the second wireless terminal performs the first hash operation on the first MAC address.

The processing unit 902 is further configured to determine that the fourth MAC address is correct, parse the first message to acquire the third identifier information and the second random parameter, perform the second hash operation on the second random parameter and the first MAC address to obtain an N-bit operation result, set the N-bit operation result as second reference identifier information, and compare the second reference identifier information with the third identifier information when the receiving unit 901 receives, at the first address interface, the first message that carries the third identifier information, the second random parameter, and the receive address being the fourth MAC address, and determine that the third identifier information is correct if the second reference identifier information is the same as the third identifier information, where an address of the first address interface is the same as the fourth MAC address.

The sending unit 903 is further configured to send the first response message that carries first indication information and the second MAC address of the wireless terminal to the first wireless terminal, where the first indication information is used to indicate that the verification succeeds.

The receiving unit 901 is further configured to receive the second message that is sent by the first wireless terminal and that carries the first MAC address of the wireless terminal, and the sending unit 903 is further configured to send a second response message carrying second indication information to the first wireless terminal when the processing unit 902 determines that the first MAC address carried in the second message received by the receiving unit 901 is the same as the second MAC address of the wireless terminal, where the second indication information is used to indicate that the first MAC address is a current MAC address of the second wireless terminal.

In the wireless terminal provided in this embodiment of the present disclosure, after receiving a first message that is sent by a first wireless terminal and that carries identifier information, the wireless terminal parses the first message to acquire the identifier information carried in the first message and a current MAC address of the first wireless terminal, determines whether the acquired identifier information is correct, and if the acquired identifier information is correct, uses a current MAC address of the wireless terminal, that is, a current MAC address of the second wireless terminal, as a sending address, uses the current MAC address of the first wireless terminal as a receive address, and sends a first response message to the first wireless terminal such that after receiving the first response message sent by the wireless terminal, the first wireless terminal further communicates with the wireless terminal according to the acquired second MAC address of the wireless terminal. Because the identifier information is carried in the first message received by the wireless terminal, an eavesdropper cannot eavesdrop on the first MAC address of the wireless terminal. Meanwhile, the wireless terminal verifies the identifier information, and when the identifier information is obtained according to the first MAC address of the wireless terminal, sends the first response message to the first wireless terminal, to notify the first wireless terminal of the current MAC address of the wireless terminal. Therefore, when a MAC address of the wireless terminal is changed, not only it is ensured that the wireless terminal is not eavesdropped on, but also the first wireless terminal can normally communicate with the wireless terminal.

Figure 12:
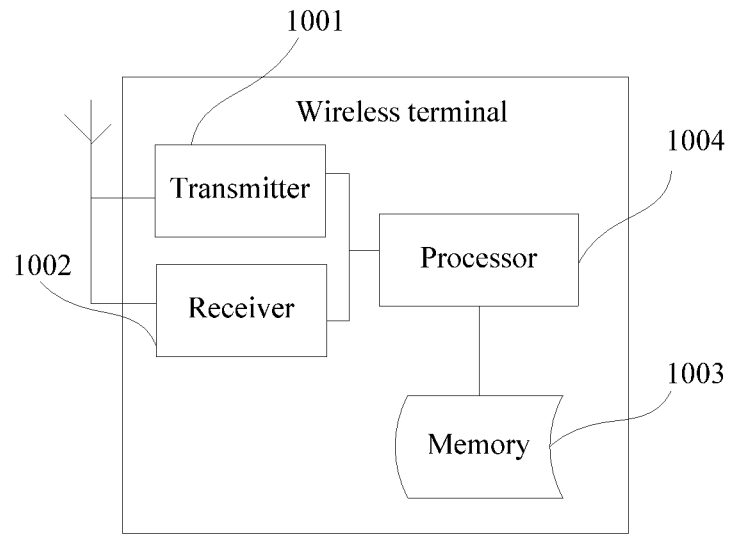
FIG. 12 is a schematic structural diagram of a wireless terminal according to an embodiment of the present disclosure.

FIG. 12 is a schematic structural diagram of a wireless terminal according to an embodiment of the present disclosure, applied to a scenario of communication based on a WLAN. As shown in FIG. 12, the wireless terminal includes a transmitter 1001, a receiver 1002, a memory 1003, and a processor 1004 separately connected to the transmitter 1001, the receiver 1002, and the memory 1003.

The memory 1003 stores a group of program code, and the processor 1004 is configured to invoke the program code stored in the memory 1003. The transmitter 1001, the receiver 1002 and the processor 1004 are configured to perform the following operations.

The processor 1004 is configured to acquire a first MAC address of a second wireless terminal.

Further, acquiring, by the processor 1004, a first MAC address of a second wireless terminal may include acquiring, from the memory 1003 of the wireless terminal, the previously stored first MAC address of the second wireless terminal, or may include acquiring the first MAC address of the second wireless terminal using the following several methods, which are as follows.

In a first method, the processor 1004 may acquire the first MAC address of the second wireless terminal using another channel except a Wi-Fi channel.

For example, the processor 1004 first scans a two-dimensional barcode in which the first MAC address of the second wireless terminal is coded, and parses the acquired two-dimensional barcode, to acquire the first MAC address included in the two-dimensional barcode.

Alternatively, when the wireless terminal is very close to the second wireless terminal, the processor 1004 may directly acquire the first MAC address of the second wireless terminal using an NFC interface of the second wireless terminal.

Alternatively, when a user knows the first MAC address of the second wireless terminal, the user enters the first MAC address of the second wireless terminal through a user interface such that the processor 1004 acquires the first MAC address of the second wireless terminal.

In a second method, the processor 1004 acquires the first MAC address of the second wireless terminal in a manner in which the receiver 1002 receives a message sent by the second wireless terminal. For example, the processor 1004 receives, using the receiver 1002, a probe request message that is broadcast by the second wireless terminal at a particular period and that carries the first MAC address of the second wireless terminal, and parses the probe request message to acquire the first MAC address of the second wireless terminal.

It should be noted that, the processor 1004 may also acquire the first MAC address of the second wireless terminal in another manner, for example, the processor 1004 may receive, using the receiver 1002, a message that is sent by another device different from the second wireless terminal and that carries the first MAC address of the second wireless terminal, and parses the message to acquire the first MAC address of the second wireless terminal, which is not limited in the present disclosure.

It should be noted that, when the wireless terminal communicates with the second wireless terminal, the wireless terminal may be a device supporting Wi-Fi, for example, a mobile phone device, and the second wireless terminal is a wireless AP, or the wireless terminal is a wireless AP, and the second wireless terminal is a device supporting Wi-Fi, or both the wireless terminal and the second wireless terminal are devices supporting Wi-Fi, which is not limited in the present disclosure.

The transmitter 1001 is configured to send a first message carrying identifier information such that the second wireless terminal receives the first message and verifies the identifier information.

The identifier information is obtained by the wireless terminal through derivation according to at least the first MAC address, and is different from the first MAC address. The identifier information is identifier information used for the second wireless terminal to verify the wireless terminal.

Further, after the processor 1004 acquires the first MAC address of the second wireless terminal, in order not to leak the first MAC address of the second wireless terminal, the processor 1004 processes the first MAC address or the first MAC address and the information that is pre-agreed between the first wireless terminal and the second wireless terminal, for example, performs a proper hash operation on the first MAC address, such as SHA-256, SHA-1, or MD-5 processing, to obtain the identifier information, adds the identifier information to the first message, and sends the first message using the transmitter 1001.

For a specific manner of sending the first message, when a receive address in a MAC message header of the first message has different content, sending manners are also different.

For example, the transmitter 1001 broadcasts the first message if the receive address in the MAC message header of the first message is a broadcast address, or the transmitter 1001 sends the first message in a unicast manner if the receive address in the MAC message header of the first message is a MAC address generated according to the identifier information.

In this way, when the second wireless terminal receives the first message sent by wireless terminal, the second wireless terminal parses the first message to acquire the identifier information carried in the first message, and compares the identifier information obtained by processing the first MAC address according to the preset rule or protocol between the wireless terminal and the second wireless terminal with the acquired identifier information, and determines that the acquired identifier information is correct if the identifier information obtained by processing the first MAC address is the same as the acquired identifier information, or determines that the acquired identifier information is incorrect if the identifier information obtained by processing the first MAC address is different from the acquired identifier information. In this way, the second wireless terminal may determine, according to whether the identifier information is correct, whether to send a response message to the wireless terminal.

It should be noted that, when the transmitter 1001 sends the first message carrying the identifier information, a used sending address is a MAC address used when the wireless terminal currently sends a message, that is, the MAC address currently used by the wireless terminal is added to a sending address in the MAC message header of the first message.

The receiver 1002 is configured to receive a first response message that is sent by the second wireless terminal and that carries a second MAC address of the second wireless terminal.

The second MAC address is a current MAC address of the second wireless terminal, and the first response message is a message sent by the second wireless terminal after the second wireless terminal successfully verifies the identifier information.

Further, after the receiver 1002 receives the first response message sent by the second wireless terminal and that carries the second MAC address of the second wireless terminal, the processor 1004 determines that verification on the sent first message carrying the identifier information succeeds, and may acquire the second MAC address of the second wireless terminal by parsing the first response message, that is, acquire the current MAC address of the second wireless terminal, to further transmit data to the second wireless terminal using the current MAC address of the second wireless terminal.

It should be noted that, the current MAC address of the second wireless terminal is a MAC address used when the second wireless terminal currently sends a message.

The processor 1004 is further configured to communicate with the second wireless terminal according to the second MAC address of the second wireless terminal received by the receiver 1002.

Further, after the receiver 1002 receives the first response message sent by the second wireless terminal, the processor 1004 parses the first response message, to acquire the second MAC address of the second wireless terminal, that is, the current MAC address of the second wireless terminal such that when needing to communicate with the second wireless terminal, the wireless terminal may use the current MAC address of the second wireless terminal as a receive address when the wireless terminal sends a message to the second wireless terminal, and uses the current MAC address of the wireless terminal as a sending address to send a message to the second wireless terminal. In this way, it may be ensured that the wireless terminal can normally communicates with the second wireless terminal.

Further, the identifier information obtained by the processor 1004 according to at least the first MAC address includes the following several types.

First type: The identifier information includes first identifier information.

The first identifier information is an M-bit operation result obtained after the processor 1004 performs a first hash operation on the first MAC address, where M is an integer greater than zero and less than a quantity of bits of the first MAC address.

Second type: The identifier information includes a third MAC address.

The third MAC address is generated by the processor 1004 according to first identifier information.

The first identifier information is an M-bit operation result obtained after the processor 1004 performs a first hash operation on the first MAC address.

Third type: The identifier information includes first identifier information and third identifier information.

The first identifier information is an M-bit operation result obtained after the processor 1004 performs a first hash operation on the first MAC address.

The third identifier information is an N-bit operation result obtained after the processor 1004 performs a second hash operation on a second random parameter and the first MAC address.

The second random parameter is generated by the processor 1004.

Fourth type: The identifier information includes a fourth MAC address and third identifier information.

The fourth MAC address is generated by the processor 1004 according to first identifier information.

The first identifier information is an M-bit operation result obtained after the processor 1004 performs a first hash operation on the first MAC address.

The third identifier information is an N-bit operation result obtained after the processor 1004 performs a second hash operation on a second random parameter and the first MAC address.

The second random parameter is generated by the processor 1004.

Further, according to different content included in the identifier information, the transmitter 1001 sends different first messages, and the content received by the receiver 1002 are different, which are as follows.

The transmitter 1001 is further configured to send the first message carrying the first identifier information when the identifier information includes the first identifier information.

The transmitter 1001 is further configured to send the first message carrying a receive address being the third MAC address generated by the processor 1004 when the identifier information includes the third MAC address.

The third MAC address is a receive address added to the MAC message header of the first message.

The transmitter 1001 is further configured to send the first message that carries the first identifier information, the second identifier information, and the second random parameter when the identifier information includes the first identifier information and the third identifier information.

The transmitter 1001 is further configured to send the first message that carries the third identifier information, the second random parameter, and a receive address being the fourth MAC address generated by the processor 1004 when the identifier information includes the fourth MAC address and the third identifier information.

The fourth MAC address is a receive address added to the MAC message header of the first message.

It should be noted that the fourth MAC address and the third MAC address may be a same MAC address.

The receiver 1002 is further configured to receive the first response message that is sent by the second wireless terminal and that carries the second identifier information, the first random parameter, and the second MAC address of the second wireless terminal when the identifier information includes the first identifier information, or when the identifier information includes the third MAC address.

The second identifier information is an N-bit operation result obtained after the second wireless terminal performs the second hash operation on the first random parameter and the first MAC address, where N is an integer greater than zero and less than a quantity of bits of the first MAC address.

The processor 1004 is further configured to parse the first response message received by the receiver 1002 to acquire the second identifier information and the first random parameter, perform the second hash operation on the first random parameter and the first MAC address to obtain an N-bit operation result, set the N-bit operation result as first reference identifier information, and compare the first reference identifier information with the second identifier information, and determine that the first response message is sent by the correct second wireless terminal if the first reference identifier information is the same as the second identifier information.

Alternatively, the receiver 1002 is further configured to receive the first response message that is sent by the second wireless terminal and that carries first indication information and the second MAC address of the second wireless terminal, where the first indication information is used to indicate that the verification succeeds.

The receiver 1002 is further configured to receive the first response message sent by the second wireless terminal and that carries the first indication information and the second MAC address of the second wireless terminal when the identifier information includes the first identifier information and the third identifier information, or when the identifier information includes the fourth MAC address and the third identifier information.

The transmitter 1001 is further configured to send the second message carrying the first MAC address of the second wireless terminal to the second wireless terminal, and the processor 1004 is further configured to determine that a current MAC address of the second wireless terminal is not the first MAC address when the receiver 1002 does not receive, within a preset time, a second response message that is sent by the second wireless terminal and that carries second indication information, where the second indication information is used to indicate that the first MAC address is a current MAC address of the second wireless terminal.

In the wireless terminal provided in this embodiment of the present disclosure, after acquiring a first MAC address of a second wireless terminal, the wireless terminal obtains identifier information according to at least the first MAC address, and sends a first message carrying the identifier information such that the second wireless terminal receives the first message, parses the first message to acquire the identifier information carried in the first message, verifies whether the acquired identifier information is correct, and when the acquired identifier information is correct, sends a first response message carrying a second MAC address of the second wireless terminal to the wireless terminal. When receiving the first response message carrying the second MAC address of the second wireless terminal, the wireless terminal may acquire the second MAC address of the second wireless terminal, and set the second MAC address of the second wireless terminal, that is, a current MAC address of the second wireless terminal, as a receive address of a message sent by the wireless terminal, and further communicate with the second wireless terminal. Because the identifier information is carried in the first message sent by the wireless terminal, an eavesdropper cannot eavesdrop on the first MAC address of the second wireless terminal. Meanwhile, the second wireless terminal verifies the identifier information, and when the identifier information is obtained according to the first MAC address of the second wireless terminal, sends the first response message to the wireless terminal, to notify the wireless terminal of the current MAC address of the second wireless terminal. Therefore, when a MAC address of the second wireless terminal is changed, not only it is ensured that the second wireless terminal is not eavesdropped on, but also the wireless terminal can normally communicate with the second wireless terminal.

Figure 13:
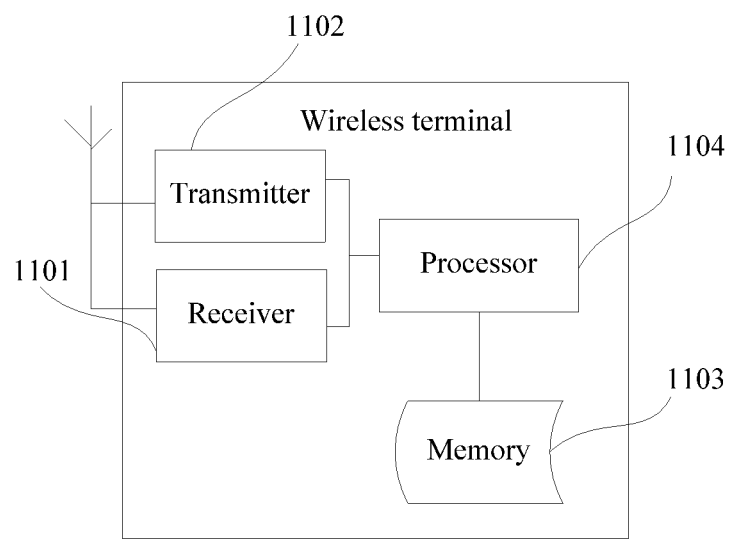
FIG. 13 is a schematic structural diagram of another wireless terminal according to an embodiment of the present disclosure.

FIG. 13 is a schematic structural diagram of a wireless terminal according to an embodiment of the present disclosure, applied to a scenario of communication based on a WLAN. As shown in FIG. 13, the wireless terminal includes a receiver 1101, a transmitter 1102, a memory 1103, and a processor 1104 separately connected to the receiver 1101, the transmitter 1102, and the memory 1103.

The memory 1103 stores a group of program code, and the processor 1104 is configured to invoke the program code stored in the memory 1103. The receiver 1101, the transmitter 1102, and the processor 1104 are configured to perform the following operations.

The receiver 1101 is configured to receive a first message that is sent by a first wireless terminal and that carries identifier information.

The identifier information is obtained by the first wireless terminal after the first wireless terminal acquires a first MAC address of the wireless terminal and according to at least the first MAC address, and is different from the first MAC address. The identifier information is identifier information used for the wireless terminal to verify the first wireless terminal.

The processor 1104 is configured to determine whether the identifier information carried in the first message received by the receiver 1101 is correct.

Further, after the receiver 1101 receives the first message that is sent by the first wireless terminal and that carries the identifier information, the processor 1104 parses the first message to acquire the identifier information carried in the first message and a MAC address currently used by the first wireless terminal, processes the first MAC address according to a preset rule or protocol between the first wireless terminal and the wireless terminal, to obtain the identifier information, compares the identifier information obtained by processing the first MAC address according to the preset protocol between the first wireless terminal and the wireless terminal with the acquired identifier information, and determines that the acquired identifier information is correct if the identifier information obtained after processing the first MAC address according to the preset rule or protocol between the first wireless terminal and the wireless terminal is the same as the acquired identifier information, or determines that the acquired identifier information is incorrect if the identifier information obtained by processing the first MAC address according to the preset rule or protocol between the first wireless terminal and the wireless terminal is different from the acquired identifier information.

The transmitter 1102 is configured to send a first response message carrying a second MAC address of the wireless terminal to the first wireless terminal when the processor 1104 determines that the identifier information carried in the first message is correct, where the second MAC address is a current MAC address of the second wireless terminal.

Further, when the processor 1104 determines that the identifier information carried in the first message is correct, the transmitter 1102 sets a MAC address currently used by the wireless terminal, that is, the second MAC address, as a sending address to send the first response message, sets a MAC address, currently used by the first wireless terminal, as a receive address of the sent first response message, and sends the first response message to the first wireless terminal.

The receiver 1101 is further configured to receive the first message sent by the first wireless terminal and that carries first identifier information, where the first identifier information is an M-bit operation result obtained after the first wireless terminal performs a first hash operation on the first MAC address, where M is an integer greater than zero and less than a quantity of bits of the first MAC address, or the receiver 1101 is further configured to receive the first message sent by the first wireless terminal and that carries first identifier information, third identifier information, and a second random parameter, where the second random parameter is a parameter generated by the first wireless terminal, and the third identifier information is an N-bit operation result obtained after the first wireless terminal performs a second hash operation on the second random parameter and the first MAC address, where N is an integer greater than zero and less than a quantity of bits of the first MAC address, or the receiver 1101 is further configured to receive the first message sent by the first wireless terminal and that carries a receive address being a third MAC address, where the third MAC address is generated by the first wireless terminal according to the first identifier information, and the third MAC address is a receive address added to a MAC message header of the first message, or the receiver 1101 is further configured to receive the first message that is sent by the first wireless terminal and that carries third identifier information, a second random parameter, and a receive address being a fourth MAC address, where the fourth MAC address is generated by the first wireless terminal according to the first identifier information, and the fourth MAC address is a receive address added to a MAC message header of the first message.

It should be noted that the fourth MAC address and the third MAC address may be a same MAC address.

It should be noted that, according to different content carried in the first message received by the receiver 1101, methods for the processor 1104 to determine whether the content carried in the first message is correct are different, content sent by the transmitter 1102 is also different, and content carried in the first message received by the receiver 1101 is also different.

The processor 1104 is further configured to parse the first message to acquire the first identifier information, and determine whether the first identifier information is the same as preset identifier information when the receiver 1101 receives the first message carrying the first identifier information, and determine that the first identifier information is correct if the first identifier information is the same as the preset identifier information, where the preset identifier information is an M-bit operation result obtained after the wireless terminal performs the first hash operation on the first MAC address.

The processor 1104 is further configured to determine that the third MAC address is correct when the receiver 1101 receives the first message carrying the receive address being the third MAC address, when the receiver receives, at a first address interface, the first message sent by the first wireless terminal, where an address of the first address interface is the same as the third MAC address.

Further, the processor 1104 is further configured to generate a first random parameter, perform the second hash operation on the first random parameter and the first MAC address to obtain an N-bit operation result, and set the N-bit operation result as second identifier information, and the transmitter 1102 is further configured to send the first response message that carries the first random parameter, the second MAC address of the wireless terminal, and the second identifier information obtained by the processor 1104 to the first wireless terminal.

The processor 1104 is further configured to parse the first message to acquire the first identifier information, the second random parameter, and the third identifier information, and determine whether the first identifier information is the same as the preset identifier information when the receiver 1101 receives the first message that carries the first identifier information, the third identifier information, and the second random parameter, and determine that the first identifier information is correct, perform the second hash operation on the second random parameter and the first MAC address to obtain an N-bit operation result, set the N-bit operation result as second reference identifier information, and compare the second reference identifier information with the third identifier information if the first identifier information is the same as the preset identifier information, and determine that the third identifier information is correct if the second reference identifier information is the same as the third identifier information, where the preset identifier information is an M-bit operation result obtained after the second wireless terminal performs the first hash operation on the first MAC address.

The processor 1104 is further configured to determine that the fourth MAC address is correct, parse the first message to acquire the third identifier information and the second random parameter, perform the second hash operation on the second random parameter and the first MAC address to obtain an N-bit operation result, set the N-bit operation result as second reference identifier information, and compare the second reference identifier information with the third identifier information when the receiver 1101 receives, at a first address interface, the first message that carries the third identifier information, the second random parameter, and the receive address being the fourth MAC address, and determine that the third identifier information is correct if the second reference identifier information is the same as the third identifier information, where an address of the first address interface is the same as the fourth MAC address.

The transmitter 1102 is further configured to send a first response message that carries first indication information and the second MAC address of the wireless terminal to the first wireless terminal, where the first indication information is used to indicate that the verification succeeds.

The receiver 1101 is further configured to receive the second message that is sent by the first wireless terminal and that carries the first MAC address of the wireless terminal, and the transmitter 1102 is further configured to send a second response message carrying second indication information to the first wireless terminal when the processor 1104 determines that the first MAC address carried in the second message received by the receiver 1101 is the same as the second MAC address of the wireless terminal, where the second indication information is used to indicate that the first MAC address is a current MAC address of the second wireless terminal.

In the wireless terminal provided in this embodiment of the present disclosure, after receiving a first message that is sent by a first wireless terminal and that carries identifier information, the wireless terminal parses the first message to acquire the identifier information carried in the first message and a current MAC address of the first wireless terminal, determines whether the acquired identifier information is correct, and if the acquired identifier information is correct, sets a current MAC address of the wireless terminal, that is, a current MAC address of the second wireless terminal, as a sending address, sets the current MAC address of the first wireless terminal as a receiving address, and sends a first response message to the first wireless terminal such that after receiving the first response message sent by the wireless terminal, the first wireless terminal further communicates with the wireless terminal according to the acquired second MAC address of the wireless terminal. Because the identifier information is carried in the first message received by the wireless terminal, an eavesdropper cannot eavesdrop on the first MAC address of the wireless terminal. Meanwhile, the wireless terminal verifies the identifier information, and when the identifier information is obtained according to the first MAC address of the wireless terminal, sends the first response message to the first wireless terminal, to notify the first wireless terminal of the current MAC address of the wireless terminal. Therefore, in a case in which a MAC address of the wireless terminal is changed, not only it is ensured that the wireless terminal is not eavesdropped on, but also the first wireless terminal can normally communicate with the wireless terminal.

Figure 14:
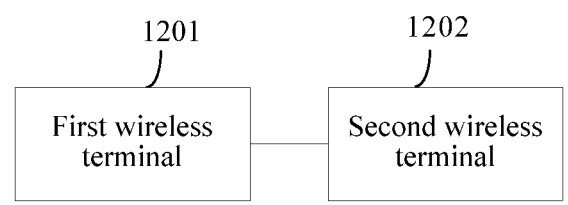
FIG. 14 is a schematic structural diagram of a system for establishing a connection by a terminal according to an embodiment of the present disclosure.

An embodiment of the present disclosure provides an information processing system, applied to a scenario of communication based on a WLAN. As shown in FIG. 14, the system includes a first wireless terminal 1201 and a second wireless terminal 1202, where the first wireless terminal 1201 is configured to acquire a first MAC address of the second wireless terminal 1202, and the first wireless terminal 1201 is configured to send a first message carrying identifier information such that the second wireless terminal 1202 receives the first message and verifies the identifier information, where the identifier information is obtained by the first wireless terminal 1201 according to at least the first MAC address, and the identifier information is identifier information used for the second wireless terminal 1202 to verify the first wireless terminal 1201.

The first wireless terminal 1201 is further configured to receive a first response message that is sent by the second wireless terminal 1202 and that carries a second MAC address of the second wireless terminal 1202, where the second MAC address is a current MAC address of the second wireless terminal, and the first response message is a message that is sent by the second wireless terminal 1202 after the second wireless terminal 1202 successfully verifies the identifier information.

The first wireless terminal 1201 is further configured to communicate with the second wireless terminal 1202 according to the second MAC address of the second wireless terminal 1202.

The second wireless terminal 1202 is configured to receive the first message sent by the first wireless terminal 1201 and that carries the identifier information, where the identifier information is obtained by the first wireless terminal 1201 after the first wireless terminal 1201 acquires the first MAC address of the second wireless terminal and through derivation according to at least the first MAC address, and the identifier information is identifier information used for the second wireless terminal 1202 to verify the first wireless terminal 1201.

The second wireless terminal 1202 is further configured to determine whether the identifier information carried in the first message is correct, and send, by the second wireless terminal 1202, the first response message carrying the second MAC address of the second wireless terminal 1202 to the first wireless terminal 1201 if the identifier information carried in the first message is correct, where the second MAC address is a current MAC address of the second wireless terminal 1202.

In the method for establishing a connection by a terminal, the apparatus, and the system that are provided in the embodiments of the present disclosure, after acquiring a first MAC address of a second wireless terminal, a first wireless terminal obtains, according to at least the first MAC address, identifier information different from the first MAC address, and sends a first message carrying the identifier information such that the second wireless terminal receives the first message, parses the first message to acquire the identifier information carried in the first message, verifies whether the acquired identifier information is correct, and when the acquired identifier information is correct, sends a first response message carrying a second MAC address of the second wireless terminal to the first wireless terminal such that after receiving the first response message that is sent by the second wireless terminal and that carries the second MAC address of the second wireless terminal, the first wireless terminal may acquire the second MAC address of the second wireless terminal, that is, a current MAC address of the second wireless terminal, and further communicate with the second wireless terminal. Because the identifier information is carried in the first message sent by the first wireless terminal, an eavesdropper cannot eavesdrop on the first MAC address of the second wireless terminal. Meanwhile, the second wireless terminal verifies the identifier information, and when determining that the identifier information is obtained according to the first MAC address of the second wireless terminal, sends the first response message to the first wireless terminal, to notify the first wireless terminal of the current MAC address of the second wireless terminal. Therefore, in a case in which a MAC address of the second wireless terminal is changed, not only it is ensured that the second wireless terminal is not eavesdropped on, but also the first wireless terminal can normally communicate with the second wireless terminal.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

In this specification, relational terms such as "first" and "second" are used only to distinguish one entity or operation from another, and do not necessarily require or imply that any actual relationship or sequence exists between these entities or operations, and also do not necessarily require that an equal or unequal relationship exists between these entities.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for establishing a connection by a terminal, comprising:
  acquiring, by a first wireless terminal, a first Media Access Control (MAC) address of a second wireless terminal;
  sending, by the first wireless terminal, a first message comprising identifier information such that the second wireless terminal receives the first message and verifies the identifier information, wherein the identifier information is obtained by the first wireless terminal according to at least the first MAC address;
  receiving, by the first wireless terminal, a first response message comprising a second MAC address of the second wireless terminal sent by the second wireless terminal and, wherein the second MAC address is a current MAC address of the second wireless terminal, and wherein the first response message is after the second wireless terminal successfully verifies the identifier information; and
  communicating, by the first wireless terminal, with the second wireless terminal according to the second MAC address.

2. The method according to claim 1, wherein the identifier information comprises first identifier information, wherein the first identifier information is an M-bit operation result obtained after the first wireless terminal performs a first hash operation on the first MAC address, and wherein M is an integer greater than zero and less than a quantity of bits of the first MAC address.

3. The method according to claim 2, wherein receiving the first response message comprises receiving, by the first wireless terminal, the first response message comprising second identifier information, a first random parameter, and the second MAC address of the second wireless terminal sent by the second wireless terminal, wherein the second identifier information is an N-bit operation result obtained after the second wireless terminal performs a second hash operation on the first random parameter and the first MAC address, wherein N is an integer greater than zero and less than the quantity of bits of the first MAC address, and wherein after receiving the first response message, the method further comprises:
  parsing, by the first wireless terminal, the first response message to acquire the second identifier information and the first random parameter;
  performing the second hash operation on the first random parameter and the first MAC address to obtain the N-bit operation result;
  setting the N-bit operation result as first reference identifier information;
  comparing the first reference identifier information with the second identifier information; and
  determining that the first response message is sent by the correct second wireless terminal when the first reference identifier information is the same as the second identifier information.

4. The method according to claim 2, wherein the identifier information comprises third identifier information, wherein the third identifier information is an N-bit operation result obtained after the first wireless terminal performs a second hash operation on a second random parameter and the first MAC address, and wherein the second random parameter is generated by the first wireless terminal.

5. The method according to claim 4, wherein sending the first message comprises sending, by the first wireless terminal, the first message comprising the first identifier information, the third identifier information, and the second random parameter.

6. The method according to claim 1, wherein the identifier information comprises a third MAC address generated by the first wireless terminal according to first identifier information, wherein the first identifier information is an M-bit operation result obtained after the first wireless terminal performs a first hash operation on the first MAC address, wherein sending the first message comprises sending, by the first wireless terminal, the first message comprising a receive address, and wherein the receive address is the third MAC address.

7. The method according to claim 1, wherein the identifier information comprises a fourth MAC address and third identifier information, wherein the fourth MAC address is generated by the first wireless terminal according to first identifier information, wherein the first identifier information is an M-bit operation result obtained after the first wireless terminal performs a first hash operation on the first MAC address, wherein the third identifier information is an N-bit operation result obtained after the first wireless terminal performs a second hash operation on a second random parameter and the first MAC address, wherein the second random parameter is generated by the first wireless terminal, wherein sending the first message comprises sending, by the first wireless terminal, the first message comprising the third identifier information, the second random parameter, and a receive address, wherein the receive address is the fourth MAC address, and wherein N and M are integers greater than zero and less them a quantity of bits of the first MAC address.

8. The method according to claim 1, wherein receiving the first response message comprises receiving, by the first wireless terminal, the first response message comprising first indication information and the second MAC address of the second wireless terminal sent by the second wireless terminal, wherein the first indication information indicates that the verification succeeds.

9. The method according to claim 1, wherein before sending the first message, the method further comprises:
sending, by the first wireless terminal, a second message comprising the first MAC address of the second wireless terminal to the second wireless terminal; and
determining that the current MAC address of the second wireless terminal is not the first MAC address when a second response message comprising second indication information sent by the second wireless terminal is not received within a preset time, wherein the second indication information indicates that the first MAC address is the current MAC address of the second wireless terminal.

10. A method for establishing a connection by a terminal, comprising:
receiving, by a second wireless terminal, a first message comprising identifier information sent by a first wireless terminal, wherein the identifier information is obtained by the first wireless terminal after the first wireless terminal acquires a first Media Access Control (MAC) address of the second wireless terminal and according to at least the first MAC address;
determining, by the second wireless terminal, whether the identifier information in the first message is correct; and
sending, by the second wireless terminal, a first response message comprising a second MAC address of the second wireless terminal to the first wireless terminal when the identifier information comprised in the first message is correct, wherein the second MAC address is a current MAC address of the second wireless terminal.

11. The method according to claim 10, wherein receiving the first message comprises:
receiving, by the second wireless terminal, the first message comprising first identifier information sent by the first wireless terminal, wherein the first identifier information is an M-bit operation result obtained after the first wireless terminal performs a first hash operation on the first MAC address, and wherein M is an integer greater than zero and less than a quantity of bits of the first MAC address;

receiving, by the second wireless terminal, the first message comprising the first identifier information, third identifier information, and a second random parameter sent by the first wireless terminal, wherein the second random parameter is a parameter generated by the first wireless terminal, wherein the third identifier information is an N-bit operation result obtained after the first wireless terminal performs a second hash operation on the second random parameter and the first MAC address, and wherein N is an integer greater than zero and less than the quantity of bits of the first MAC address;

receiving, by the second wireless terminal, the first message comprising a receive address sent by the first wireless terminal, wherein the receive address is a third MAC address, and wherein the third MAC address is generated by the first wireless terminal according to first identifier information; or receiving, by the second wireless terminal, the first message comprising the third identifier information, the second random parameter, and the receive address sent by the first wireless terminal, wherein the receive address is a fourth MAC address, and wherein the fourth MAC address is generated by the first wireless terminal according to the first identifier information.

12. A wireless terminal, comprising:
a processor configured to acquire a first Media Access Control (MAC) address of a second wireless terminal;
a transmitter coupled to the processor and configured to send a first message comprising identifier information such that the second wireless terminal receives the first message and verifies the identifier information, wherein the identifier information is obtained by the wireless terminal according to at least the first MAC address;
a receiver coupled to the processor and configured to receive a first response message comprising a second MAC address of the second wireless terminal sent by the second wireless terminal, wherein the second MAC address is a current MAC address of the second wireless terminal, and wherein the first response message is a message sent by the second wireless terminal after the second wireless terminal successfully verifies the identifier information, and
wherein the processor is further configured to communicate with the second wireless terminal according to the second MAC address of the second wireless terminal received by the receiver.

13. The wireless terminal according to claim 12, wherein the identifier information comprises first identifier information, wherein the first identifier information is an M-bit operation result obtained after the processor perforins a first hash operation on the first MAC address, and wherein M is an integer greater than zero and less than a quantity of bits of the first MAC address.

14. The wireless terminal according to claim 13, wherein the receiver is further configured to receive the first response message comprising second identifier information, a first random parameter, and the second MAC address of the second wireless terminal sent by the second wireless terminal, wherein the second identifier information is an N-bit operation result obtained after the second wireless terminal performs a second hash operation on the first random parameter and the first MAC address, wherein N is an integer greater than zero and less than the quantity of bits of the first MAC address, and wherein the processor is further configured to:
parse the first response message received by the receiver to acquire the second identifier information and the first random parameter;
perform the second hash operation on the first random parameter and the first MAC address to obtain the N-bit operation result;
set the N-bit operation result as first reference identifier information;
compare the first reference identifier information with the second identifier information; and
determine that the first response message is sent by the correct second wireless terminal when the first reference identifier information is the same as the second identifier information.

15. The wireless terminal according to claim 13, wherein the identifier information further comprises third identifier information, wherein the third identifier information is an N-bit operation result obtained after the processor performs a second hash operation on a second random parameter and the first MAC address, wherein the second random parameter is generated by the processor, and wherein N is an integer greater than zero and less than a quantity of bits of the first MAC address.

16. The wireless terminal according to claim 15, wherein the transmitter is further configured to send the first message comprising the first identifier information, the third identifier information, and the second random parameter that are obtained by the processor.

17. The wireless terminal according to claim 12, wherein the identifier information comprises a third MAC address generated by the processor according to first identifier information, wherein the first identifier information is an M-bit operation result obtained after the processor performs a first hash operation on the first MAC address, wherein the transmitter is further configured to send the first message comprising a receive address, and wherein the receive address is the third MAC address generated by the processor.

18. The wireless terminal according to claim 12, wherein the identifier information comprises a fourth MAC address and third identifier information, wherein the fourth MAC address is generated by the processor according to first identifier information, wherein the first identifier information is an M-bit operation result obtained after the processor performs a first hash operation on the first MAC address, wherein the third identifier information is an N-bit operation result obtained after the processor performs a second hash operation on a second random parameter and the first MAC address, wherein the second random parameter is generated by the processor, wherein the transmitter is further configured to send the first message comprising the third identifier information, the second random parameter, and a receive address, wherein the receive address is the fourth MAC address that is generated by the processor, and wherein N and M are integers greater than zero and less than a quantity of bits of the first MAC address.

19. The wireless terminal according to claim 12, wherein the receiver is further configured to receive the first response message comprising first indication information and the second MAC address of the second wireless terminal sent by the second wireless terminal, and wherein the first indication information indicates that the verification succeeds.

20. The wireless terminal according to claim 12, wherein the transmitter is further configured to send a second message comprising the first MAC address of the second wireless terminal to the second wireless terminal, and
wherein the processor is further configured to determine that the current MAC address of the second wireless terminal is not the first MAC address when the receiver does not receive, within a preset time, a second response message comprising second indication information sent by the second wireless terminal, wherein the second indication information indicates that the first MAC address is the current MAC address of the second wireless terminal.

* * * * *

UNITED STATES PATENT AND TRADEMARK OFFICE
CERTIFICATE OF CORRECTION

PATENT NO. : 10,321,493 B2
APPLICATION NO. : 15/329429
DATED : June 11, 2019
INVENTOR(S) : Xiaoxian Li, Zhiming Ding and Su Lu Page 1 of 1

It is certified that error appears in the above-identified patent and that said Letters Patent is hereby corrected as shown below:

On the Title Page

Item (30), Foreign Application Priority Data should read "2014 1 0374903.6"

In the Claims

Claim 7, Column 49, Line 18, "them" should read "than"

Claim 13, Column 50, Line 53, "perforins" should read "performs"

Signed and Sealed this
Twentieth Day of August, 2019

Andrei Iancu
*Director of the United States Patent and Trademark Office*